(12) United States Patent
Peoples

(10) Patent No.: US 6,914,963 B2
(45) Date of Patent: Jul. 5, 2005

(54) DETERMINING THE COMPOSITION OF SUBSCRIBER LOOPS FROM FREQUENCY DOMAIN MEASUREMENTS

(75) Inventor: John T. Peoples, Warren, NJ (US)

(73) Assignee: Telcordia Technologies, Inc., Piscataway, NJ (US)

(*) Notice: Subject to any disclaimer, the term of this patent is extended or adjusted under 35 U.S.C. 154(b) by 101 days.

(21) Appl. No.: 10/061,815

(22) Filed: Feb. 1, 2002

(65) Prior Publication Data
US 2002/0146095 A1 Oct. 10, 2002

Related U.S. Application Data
(60) Provisional application No. 60/265,411, filed on Feb. 1, 2001.

(51) Int. Cl.[7] .......................... H04M 1/24; H04M 3/08; H04M 3/22
(52) U.S. Cl. ................ 379/22.03; 379/1.01; 379/22.02; 379/24
(58) Field of Search ............................. 379/29.01, 30, 379/1.01, 1.03, 1.04, 14.01, 21, 22, 22.01, 22.02, 22.03, 24, 27.01, 27.03, 27.08, 28

(56) References Cited

U.S. PATENT DOCUMENTS

| | | | |
|---|---|---|---|
| 3,904,839 A | 9/1975 | Peoples ................ 179/175.3 |
| 5,526,426 A | * 6/1996 | McLaughlin .......... 379/406.13 |
| 5,881,130 A | * 3/1999 | Zhang .................... 379/27.08 |
| 5,917,809 A | * 6/1999 | Ribner et al. .............. 370/286 |
| 5,949,236 A | * 9/1999 | Franchville ................ 324/533 |
| 6,417,672 B1 | * 7/2002 | Chong ....................... 324/520 |
| 6,466,649 B1 | * 10/2002 | Walance et al. ......... 379/22.03 |
| 6,487,276 B1 | 11/2002 | Rosen et al. ............... 379/1.04 |

* cited by examiner

Primary Examiner—Quoc Tran
(74) Attorney, Agent, or Firm—William A. Schoneman; Joseph Giordano

(57) ABSTRACT

Techniques for estimating distances to irregularities on a subscriber loop are described. A loop response is measured in the frequency domain. The loop response is weighted by a prolate spheroidal wave function to yield a weighted response. The weighted response is transformed to a spectral domain, and peaks in the spectral domain are identified as the distances to the irregularities.

19 Claims, 23 Drawing Sheets

DETERMINING THE COMPOSITION OF SUBSCRIBER LOOPS FROM FREQUENCY DOMAIN MEASUREMENTS

CROSS REFERENCE TO RELATED APPLICATION

This application claims the benefit of U.S. Provisional No. 60/265,411, filed Feb. 1, 2001, the contents of which are herein incorporated by reference.

BACKGROUND OF THE INVENTION

1. Field of the Invention

This invention relates to telephone subscriber loops and, more particularly, to methodologies and concomitant systems for determining the composition of a subscriber loop from frequency domain measurements at the input of the loop.

2. Description of the Background Art

With the deployment of high-speed data transmission techniques on subscriber telephone loops, such as ISDN (Integrated Services Digital Network) and DSL (Digital Subscriber Loop), there has been a renewed interest in devising a technique for determining the composition of the loops from so-called single-ended measurements in order to qualify such loops for such high-speed digital transmission. A telephone subscriber loop typically connects a customer with a local telephone central office and is composed of lengths of copper cable such as, for example 26 gauge or 24 gauge cable. It is especially desirable to estimate the configuration of a loop from measurements made at the end of the loop terminating at the central office. For example, one might measure the complex input impedance at the input of the loop over a range of frequencies (generally referred to as the frequency domain or "swept-frequency approach"), or the time-domain echo at the input to the loop (generally referred to as the time domain or "time domain reflectometer" approach). From these measurements, the composition of the loop is estimated using identifiable characteristics in the response, such as peaks of return signals in the frequency domain or time intervals between peaks in the response signal. Moreover, based upon estimates of the loop configuration from these measurements, it is further possible to estimate the transmission characteristics of the loop to the customer end. It is desirable to effect such measurements using a single-ended approach at the central office so such tests can be automated.

One prior art reference that treats aspects of the loop composition problem is U.S. Pat. No. 3,904,839, dated Sep. 9, 1975, issued to Peoples and entitled "Loop Fault Locator". The focus of '839 is on locating cable "faults". In the past, a successful fault location program generally involved the following steps: fault sectionalization, fault localization, and fault pinpointing. Each step produced a more refined estimate to the location of a fault. The goal of fault sectionalization is that of locating the access point (e.g., terminal, splice, cross-connect box) nearest the fault from measurements at the central office. The fault localization activity uses measurements at the access point to further refine the estimate of the location of the fault. Finally, fault pinpointing involves "walking" the loop with loop test equipment to zero in on the fault.

The definition of "fault" is very broad in this context. Certain loop conditions are indeed faults, such as an open in one of the two conductors comprising a loop, or a short at some point in the loop. On the other hand, other conditions are truly not faults in the usual sense; for example, a gauge change (a cable of one gauge such as 26 gauge being spliced to a cable of another gauge such as 24 gauge) could be interpreted as a fault since there is an electrical discontinuity at the junction of the two gauges (that is, the two gauges have different primary or secondary electrical constants). However, such a cascade of gauges is actually designed into the loop. The smaller gauge such as 26 gauge is purposely placed closest to the central office to reduce congestion in conduits. Other, coarser gauges are used remotely from the central office to ensure the customer has sufficient current to operate the telephone or other customer premises equipment. The terminology is generalized herein so both actual faults and perturbations due to, for example, gauge changes or the end-of-loop are referred to as irregularities.

The technique of '839 uses a frequency domain approach. The input impedance phase derivative is measured across a range of several octaves above a specified starting frequency to produce a corresponding periodic function. Each irregularity (such as low resistance splice or a gauge change) produces an additive sinusoidal variation in the phase derivative as frequency is increased. The frequency of each sinusoidal variation is linearly related to the distance to the corresponding irregularity and, therefore, provides an estimate to the distance to the irregularity. The frequencies of the sinusoids are determined, using analog or digital means such as computer processing, from the maxima in a transformed function determined from the periodic swept-frequency function.

Numerous other loop functions are measurable at the input to the loop, including the magnitude of the input impedance, the real part of the input impedance, the imaginary part of the input impedance, the phase or phase derivative of the input impedance, and functions related to the return loss (a term of art wherein the input impedance is compared to a reference impedance) such as the real part, the imaginary part, and so forth as for the input impedance alone. The '839 reference uses the phase Wderivative of the input impedance because, empirically, it is the most sensitive indicator of the distance to irregularities.

There are known limitations on single-ended measurements made in either the time domain or frequency domain. For example, with the swept-frequency technique of '089, if two faults are closely spaced, then the power spectral peak of one fault can dominate or mask the power spectral peak of the other fault. This problem is characterized as one of "resolution", that is, how far apart must irregularities be in order to mitigate interaction to find the associated peak of each irregularity. There is no ready answer to this; each loop must be evaluated separately due to the complexity of the interaction effects of various irregularities. Also, each irregularity gives rise to a multiplicity of sinusoidal terms that can mask even the fundamental sinusoidal frequency of another irregularity. This masking effect is not crucial if the intent is to merely "sectionalize" an irregularity. However, to qualify loops for ISDN or DSL deployment, the coarse results obtained by using the technique of '089 are typically not satisfactory.

Besides the limitations imposed by loop composition such as closely space irregularities, there is also the known problem of estimating peaks in a power spectrum which has been generated using data limited to a finite range of frequencies. This problem falls into the class of interval-limited time or frequency domain sampling. The limited amount of data is equivalent to truncating the complete frequency domain representation of the function being measured by a "weight function". The default, and typical, weight function is a rectangular window. However, such a weight function severely distorts the peaks in the power spectrum because of the interaction of the slow decay of the weight function in the power spectral domain, that is, the transform domain. Improved resolution can be achieved if another weight window is used. Known examples of such weight windows are the raised-cosine, Hamming window, or Kaiser window. However, even with these "weight windows" there is still the possibility of distortion in the transform domain because of so-called "aliasing" wherein spectral components are interfered with by the decay (albeit more rapid than the rectangular window) of these weight functions in the transform domain.

The prior art is devoid of improved signal processing techniques that can refine the resolution of the swept-frequency measurements so as to further identify previously-masked peaks in the power spectrum. Whenever more peaks can be identified, the composition of the loop can be estimated with greater accuracy.

SUMMARY OF THE INVENTION

These shortcomings, as well as other limitations and deficiencies are obviated, in accordance with the present invention relating to the composition of a subscriber loop, by improved signal processing techniques that can refine the resolution of the swept-frequency measurements so as to further identify previously-masked peaks in the power spectrum.

In accordance with a broad method aspect of the present invention, a method for estimating distances to irregularities on a subscriber loop includes: (a) measuring a loop response as a function of frequency at a loop end; (b) weighting the loop response with a pre-selected prolate spheroidal wave function to produce a weighted response; and (c) generating a spectral analysis of the weighted response wherein the estimated distances to the irregularities correspond to peaks in the spectral analysis.

In accordance with another broad method aspect of the present invention, a method for estimating distances to irregularities on a subscriber loop includes: (a) measuring the real part of the return loss of the loop using a pre-selected reference impedance over a band of frequencies to generate a loop response; (b) weighting the loop response with a spectral window to generate a weighted loop response; (c) iteratively multiplying the weighted loop response with a pre-determined multiplier function to produce a characteristic function; (d) transforming each iteratively produced characteristic function to determine a set of corresponding characteristic values; and (e) selecting local maxima from the set of characteristic values as estimates to the distances to the irregularities. The broad system aspect of the present invention is commensurate with this broad method aspect.

BRIEF DESCRIPITON OF THE DRAWING

The teachings of the present invention can be readily understood by considering the following detailed description in conjunction with the accompanying drawings, in which.

Figure 3:
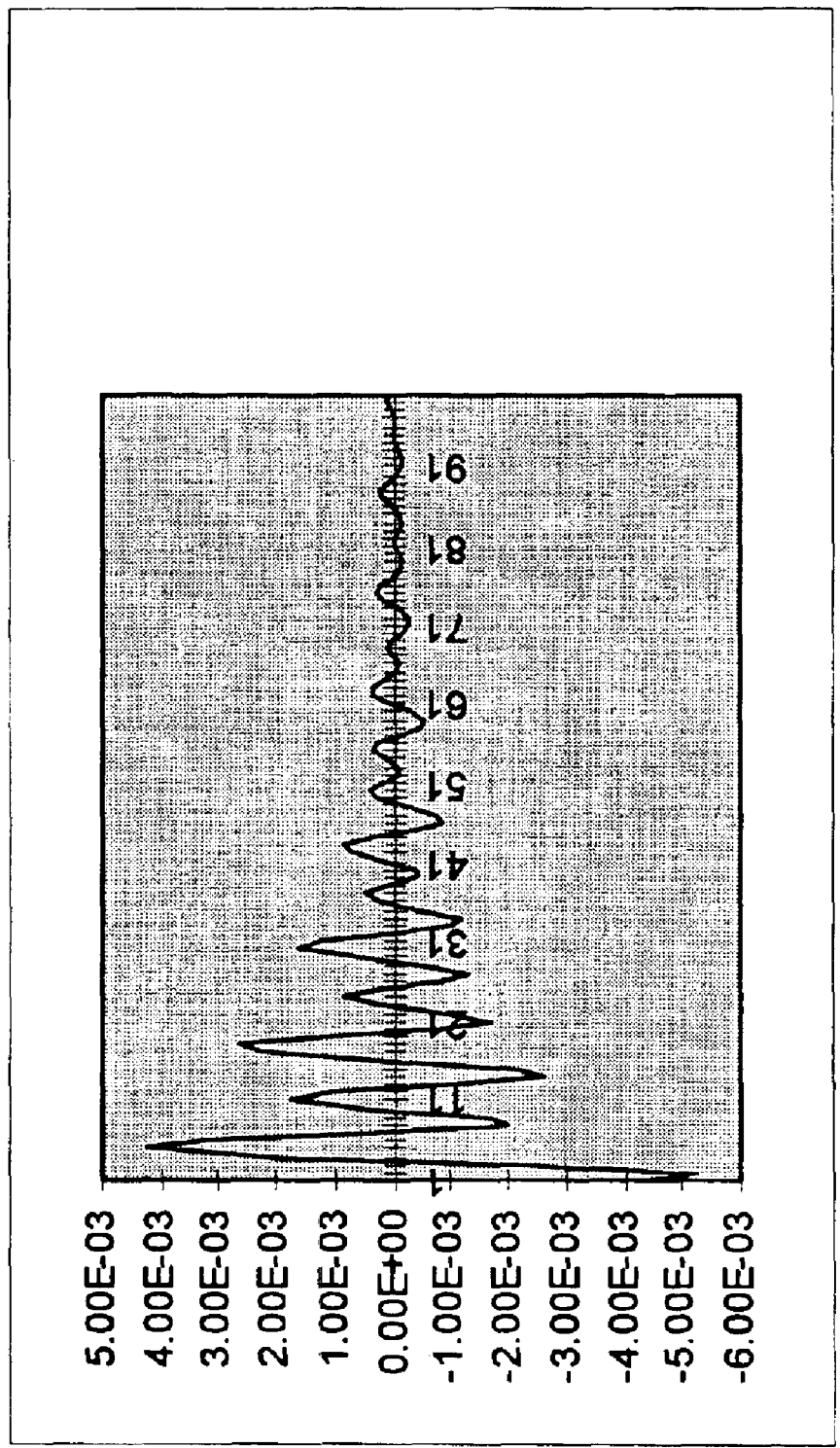
FIG. 3 is a frequency-domain plot of a loop response corresponding to the real part of return loss for a loop composed of 5000 feet of 26-gauge cable in cascade with 3000 feet of 24-gauge cable feet terminated in a conventional telephone set wherein the reference impedance equals to the characteristic impedance of 26-gauge cable and the frequency ranges from 100 kHz to 600 kHz.
Figure 4:
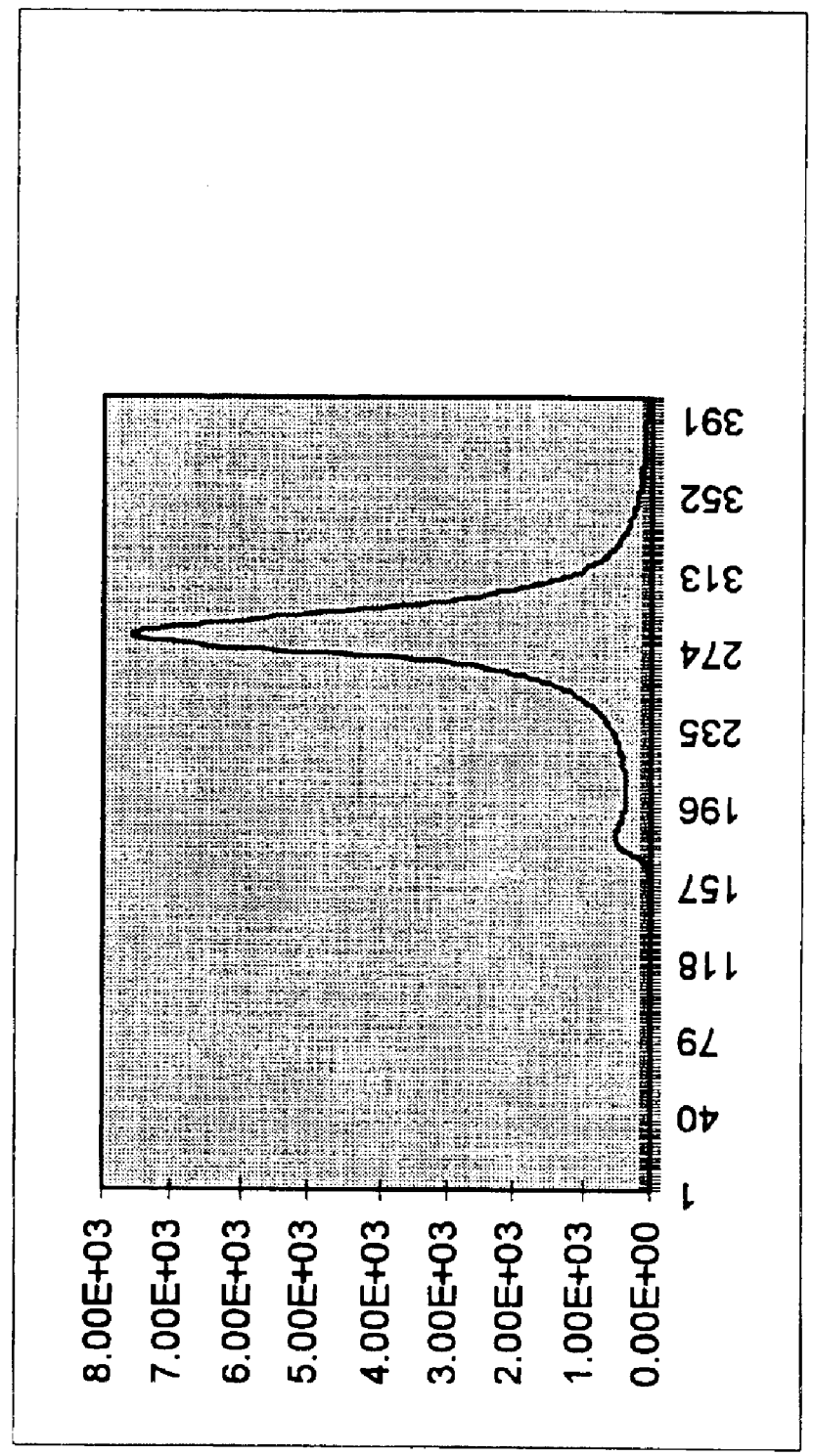
FIG. 4 is a transform domain or spectral domain plot of the loop response of FIG. 3 depicting a discernible peak corresponding to the end of the loop at 8000 feet and an essentially "masked peak" corresponding to the gauge change at 5000 feet using a technique of the prior art.
Figure 8A:
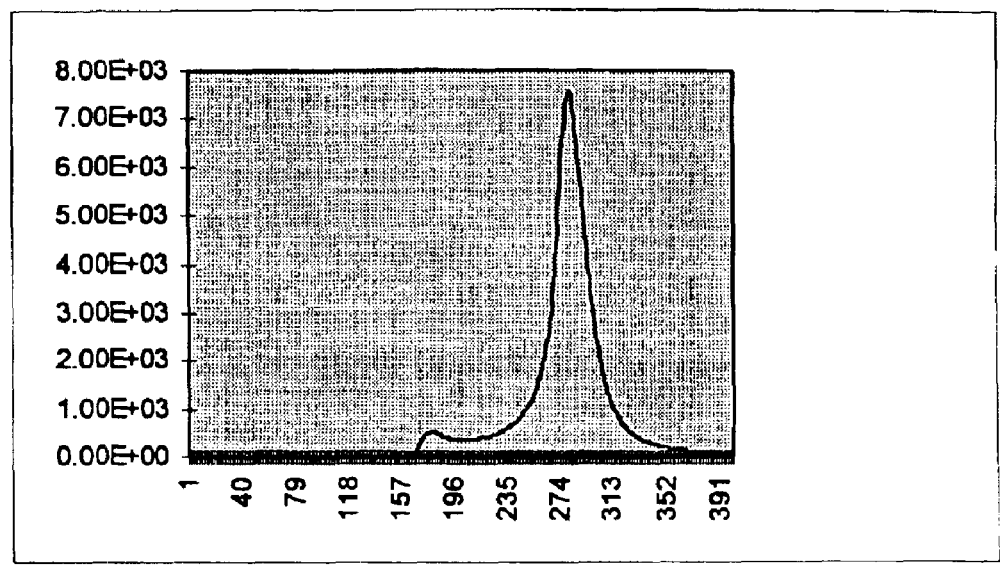
Figure 8B:
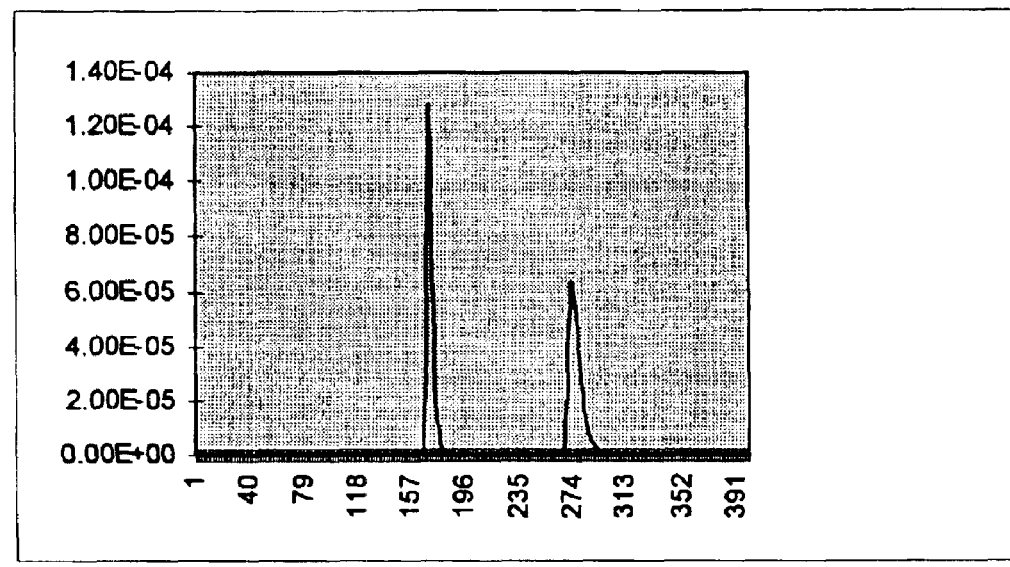
Figure 9:
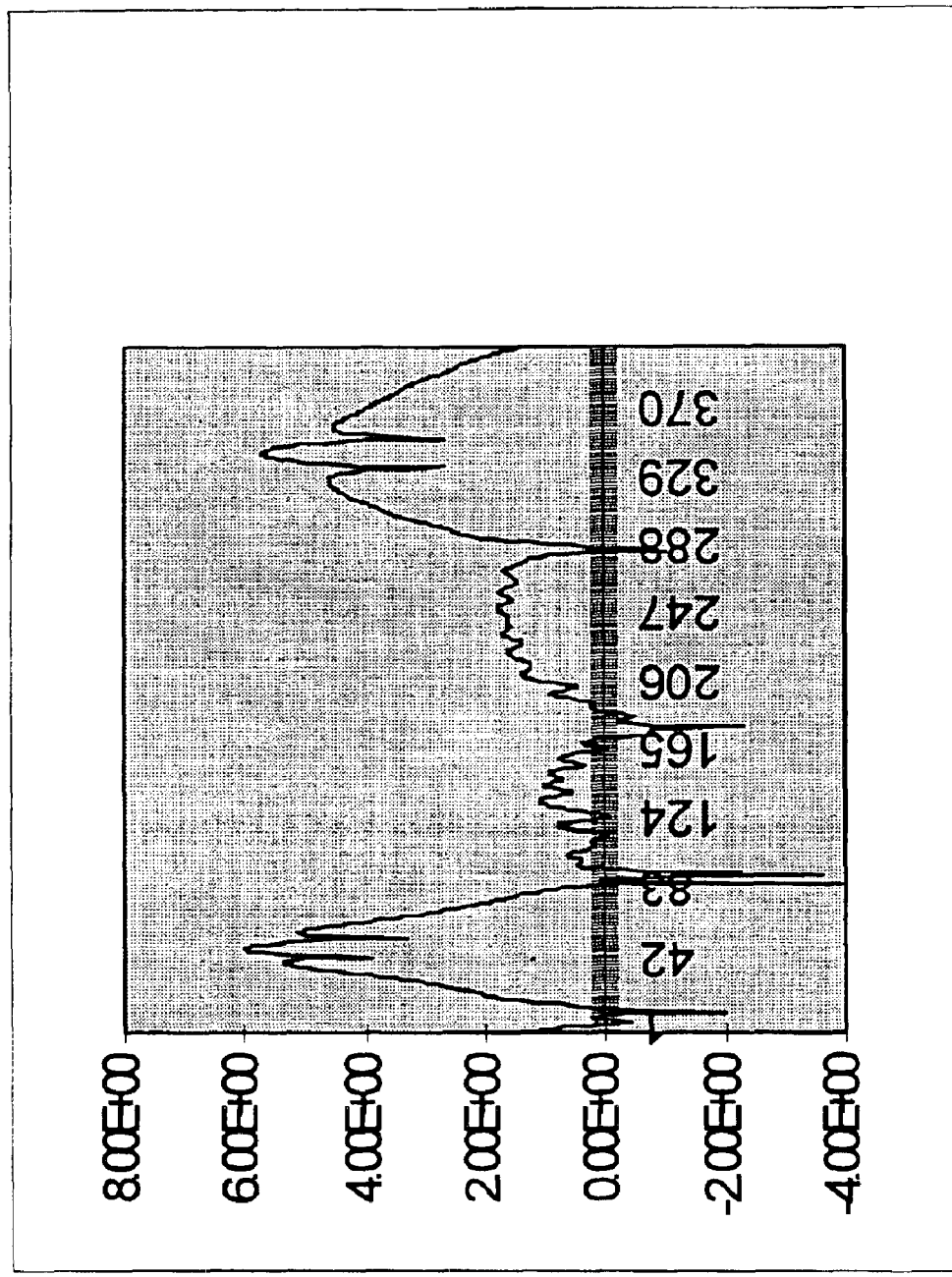
Figure 10:
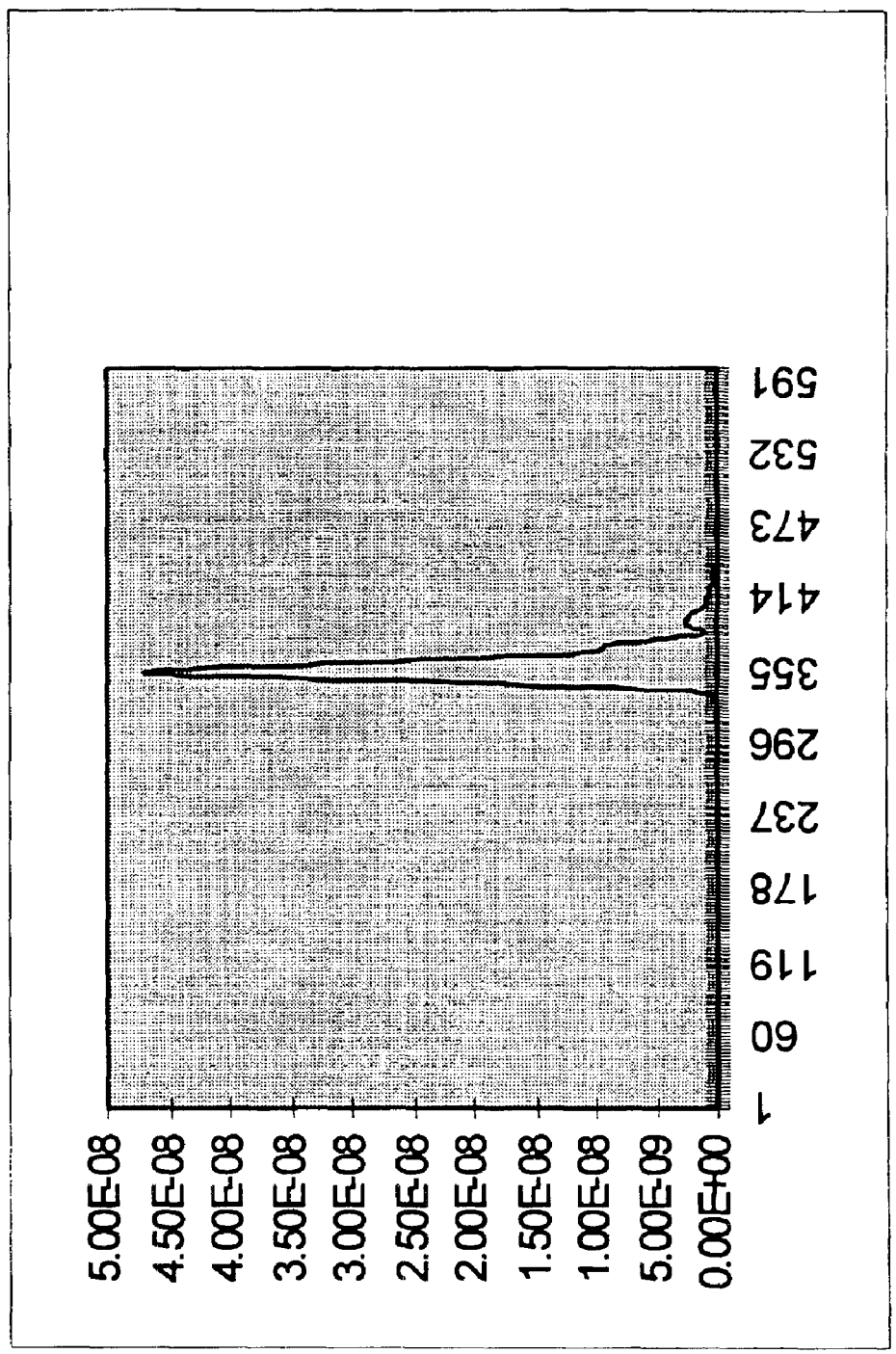
Figure 11A:
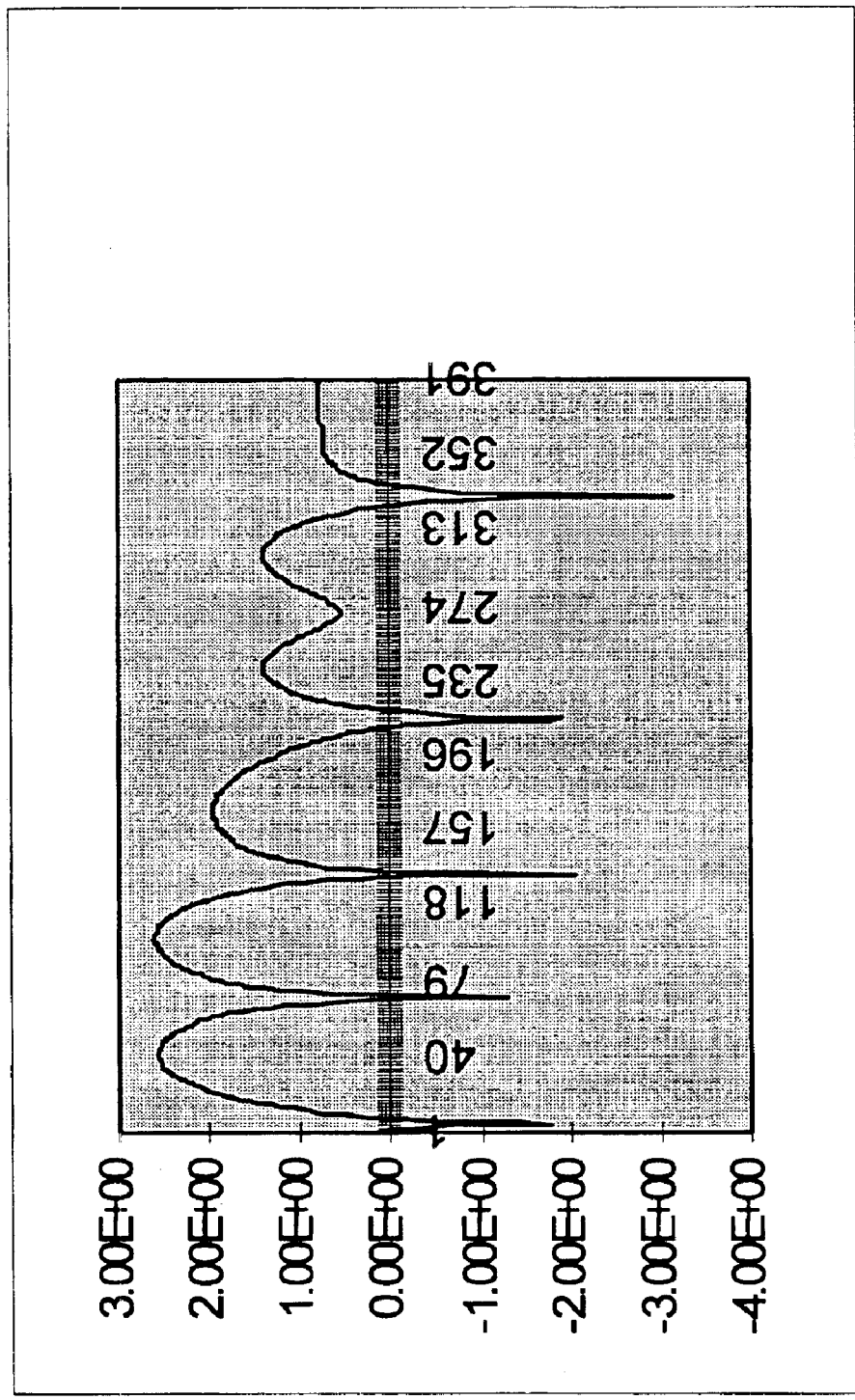
Figure 11B:
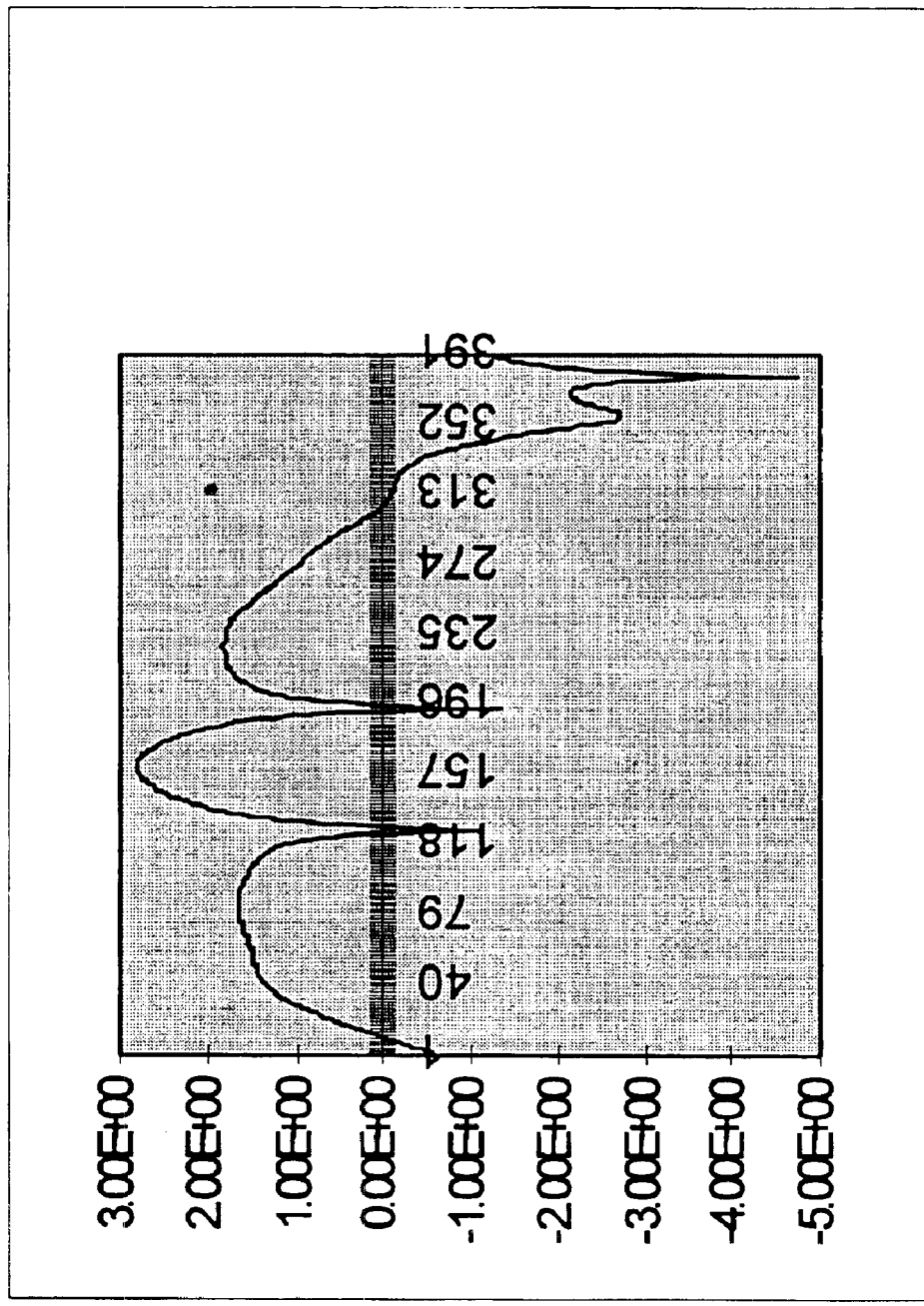
Figure 11C:
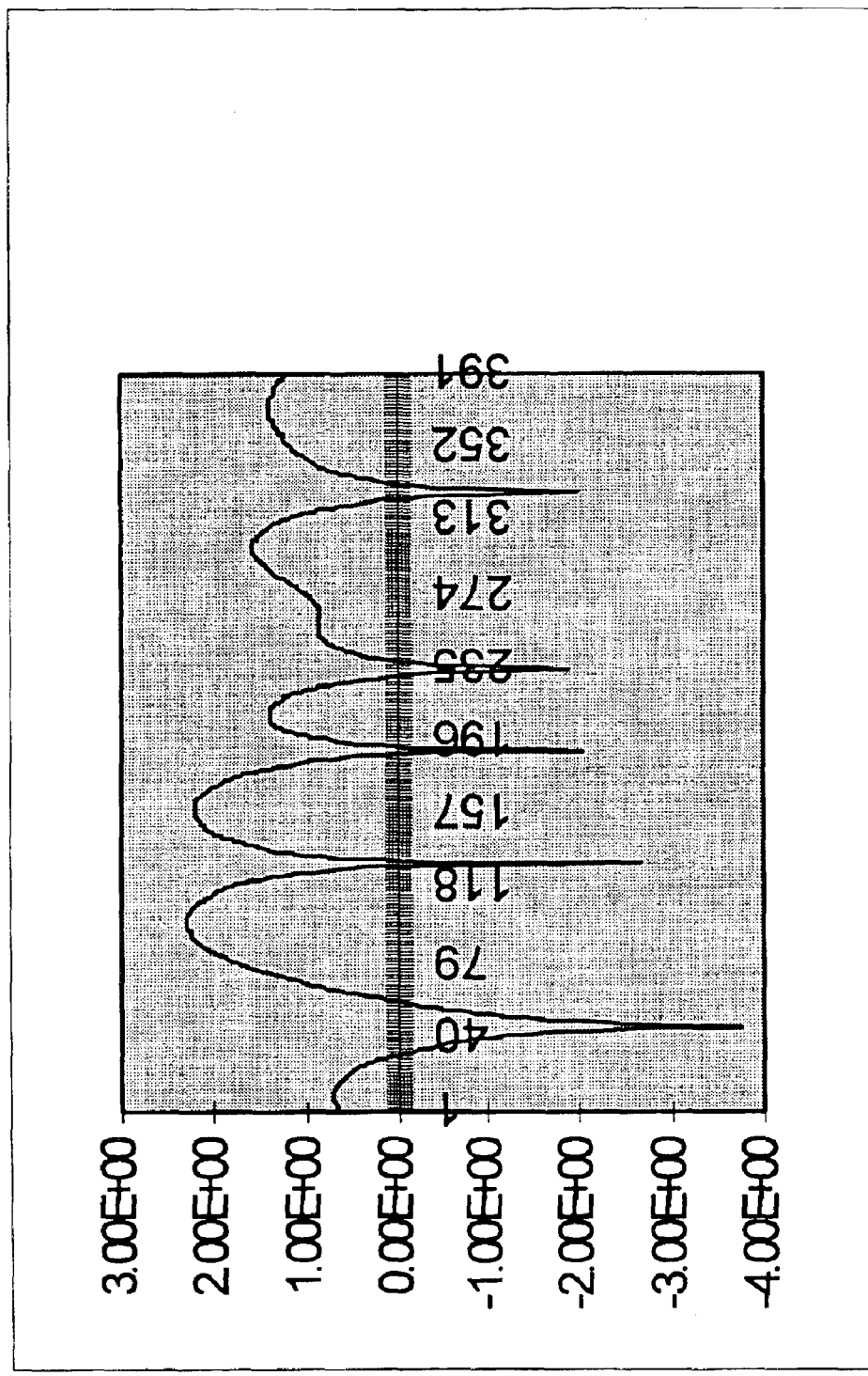
Figure 11D:
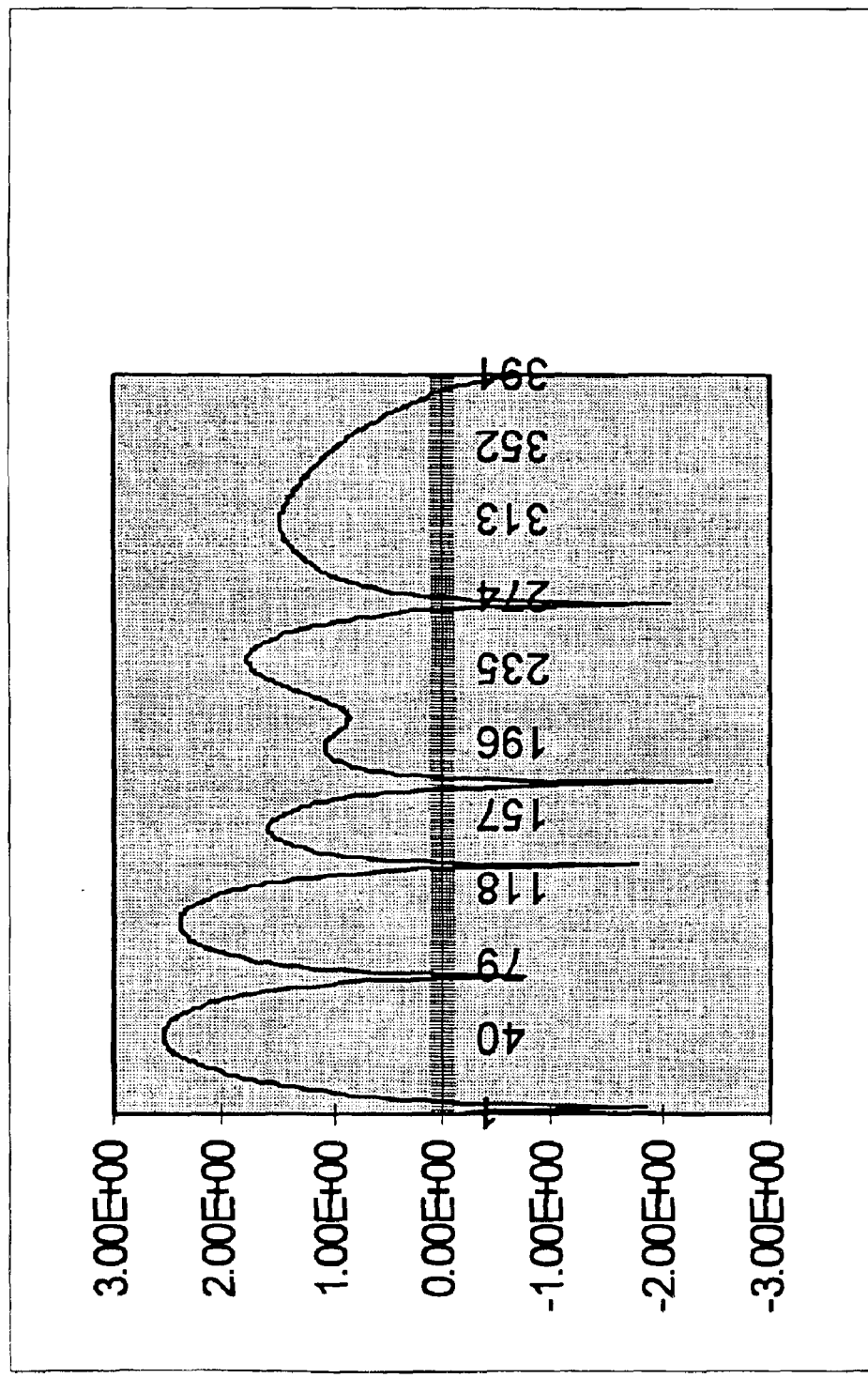
Figure 11E:
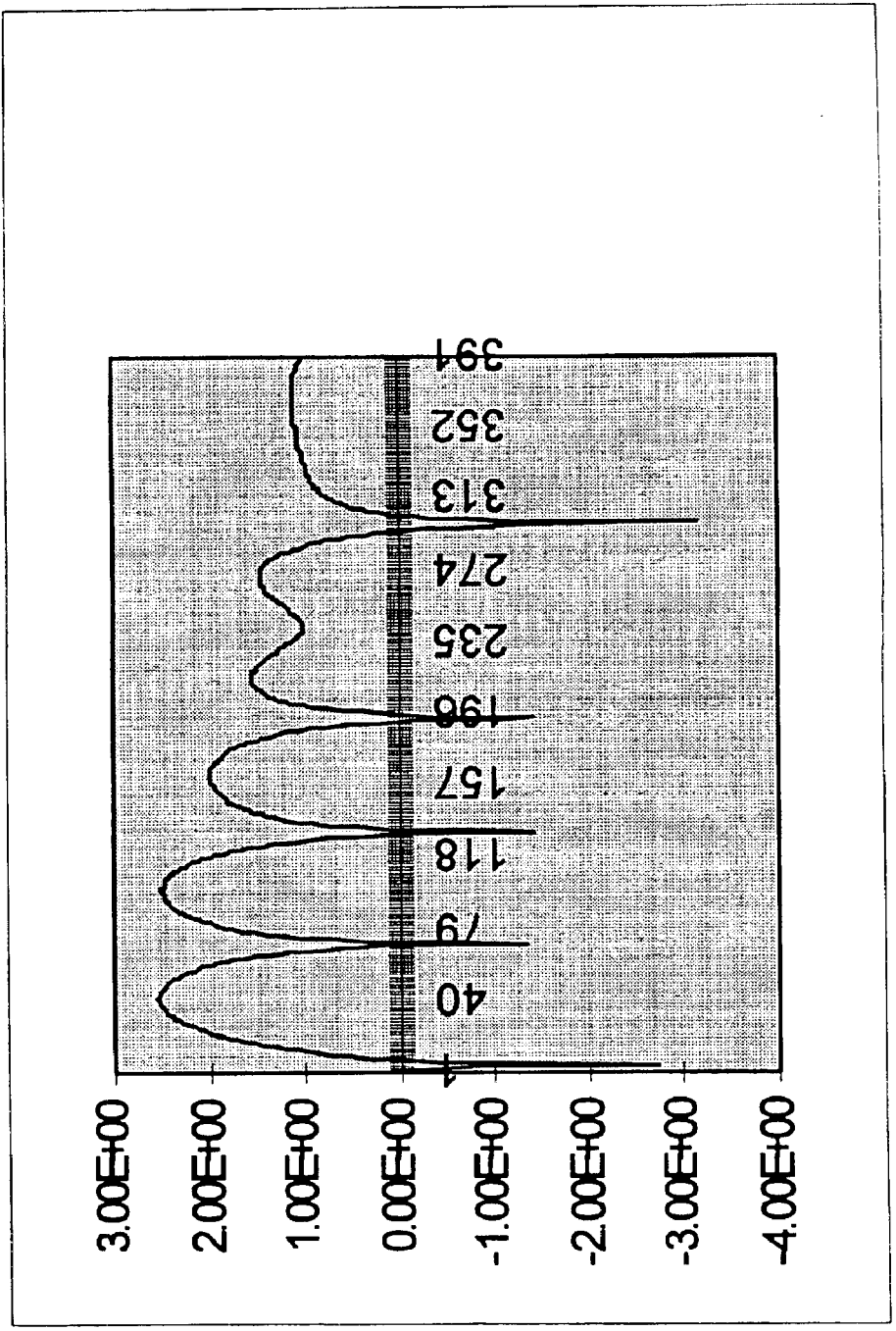
Figure 11F:
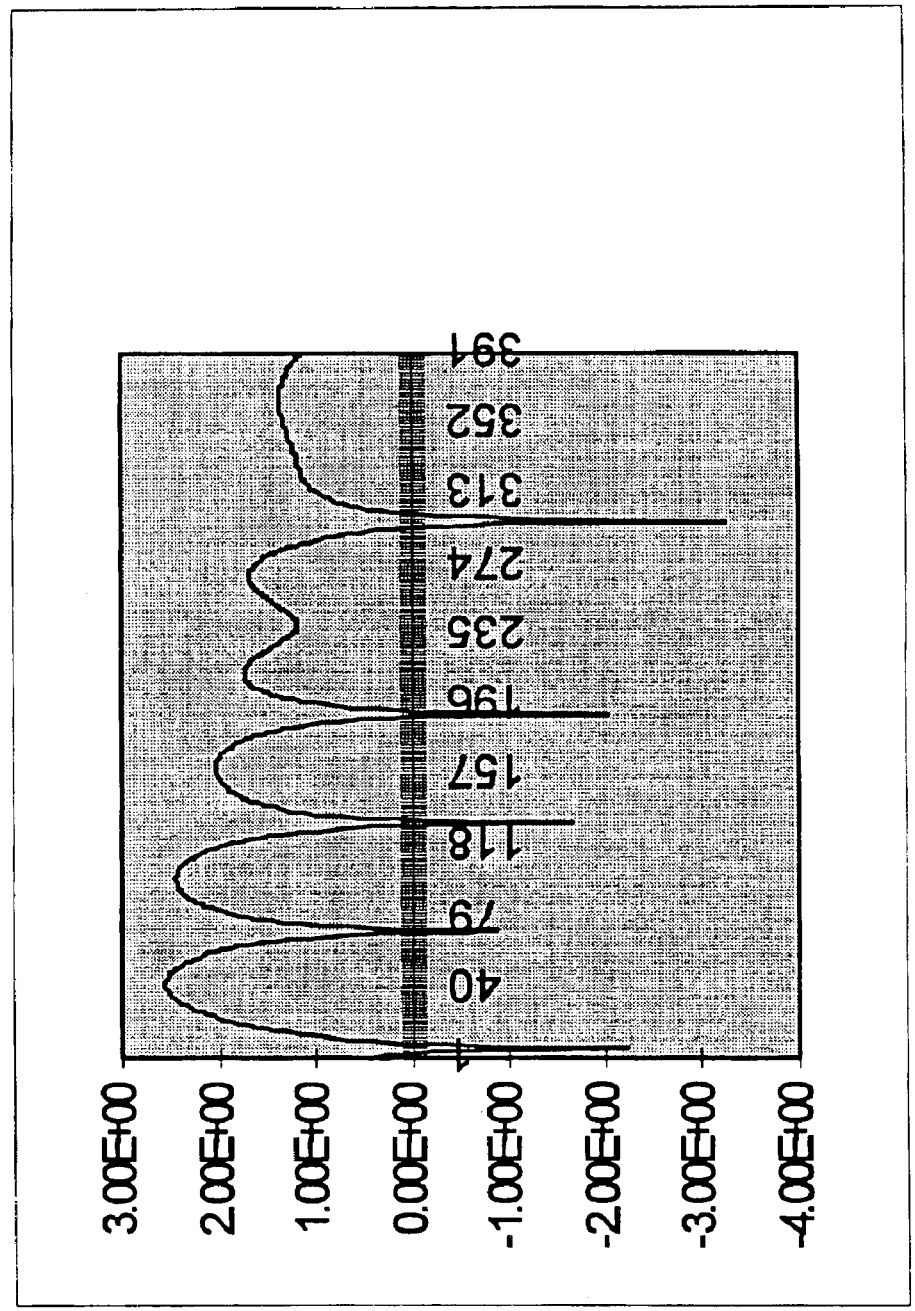
Figure 11G:
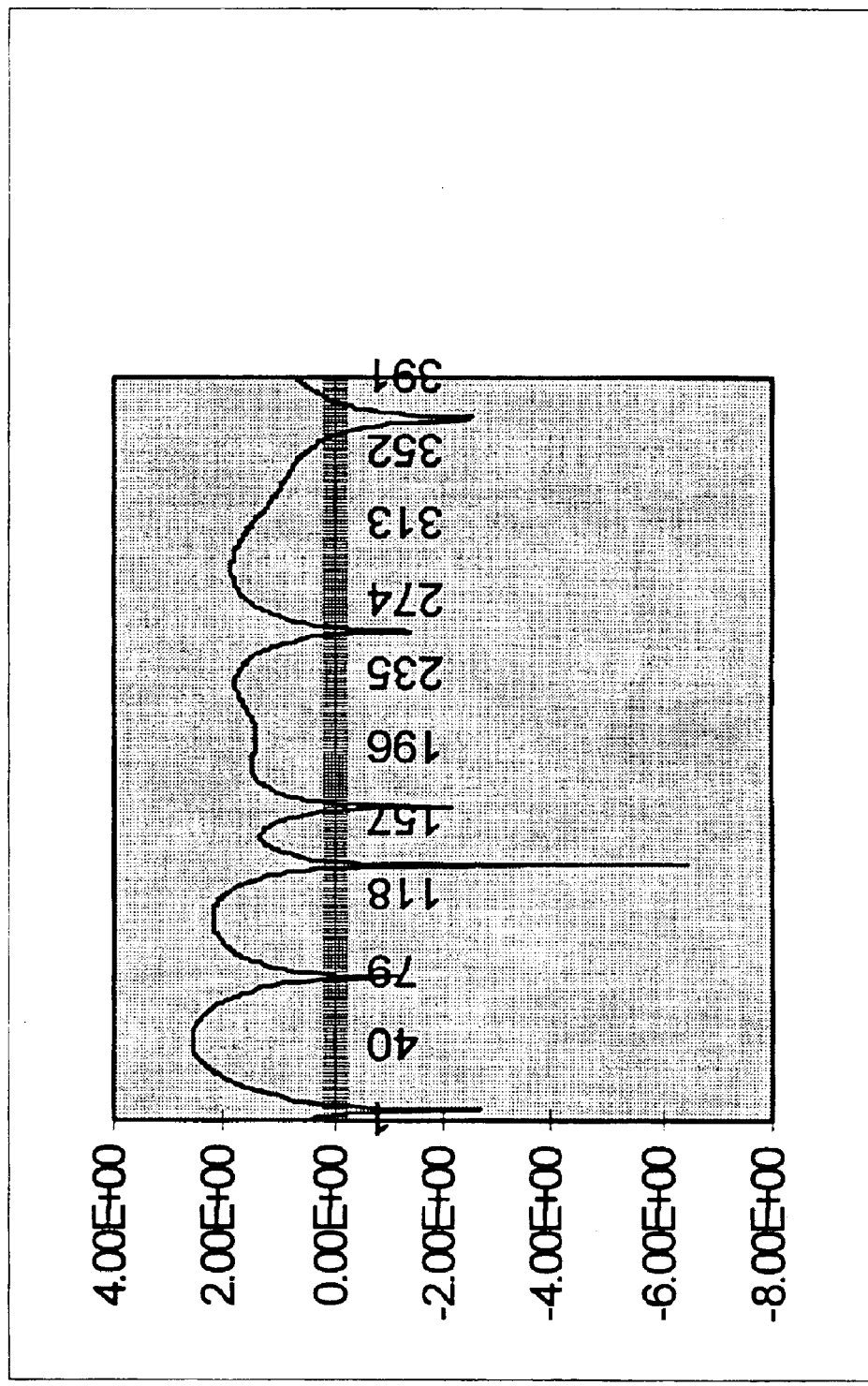
Figure 11H:
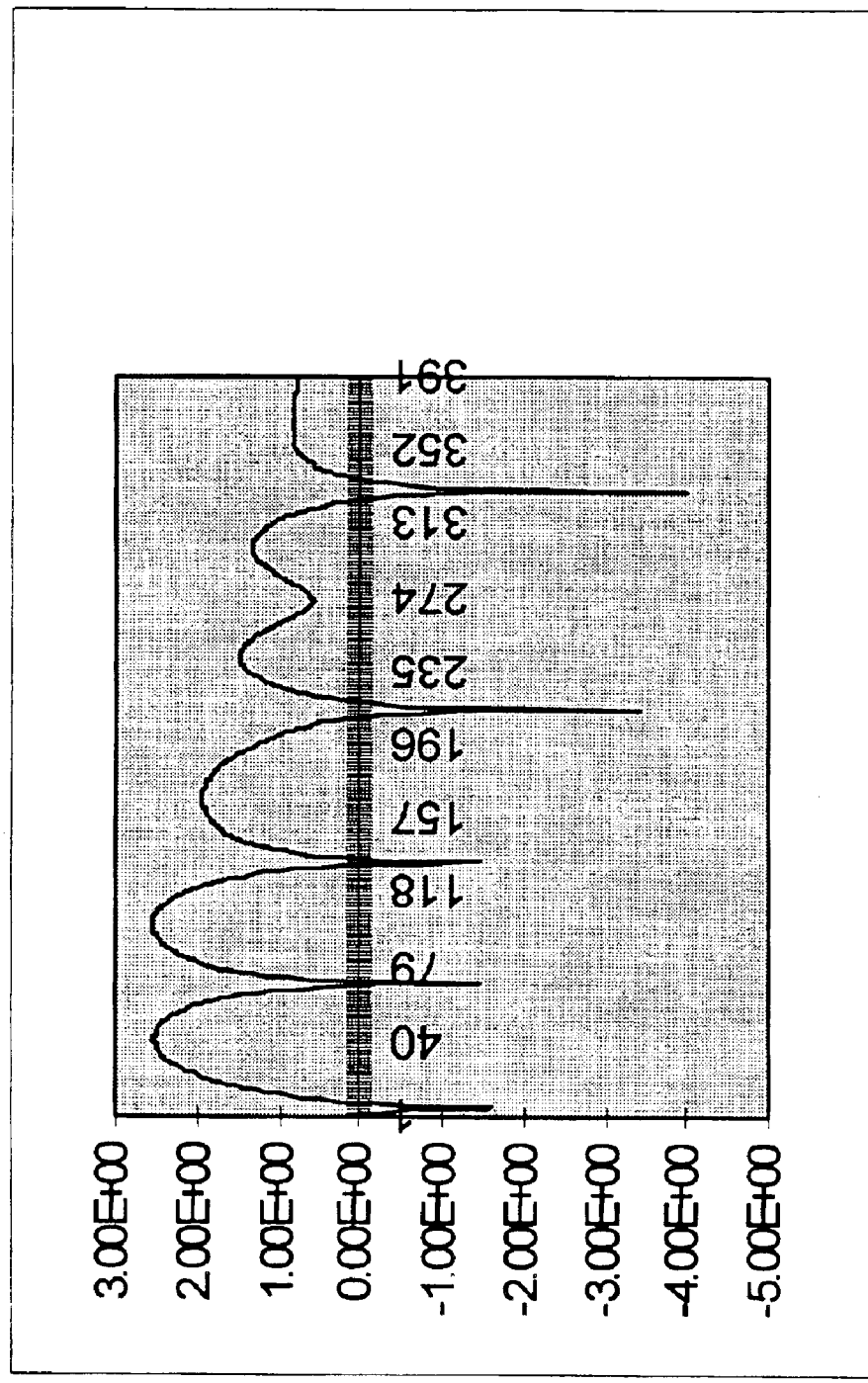
Figure 11I:
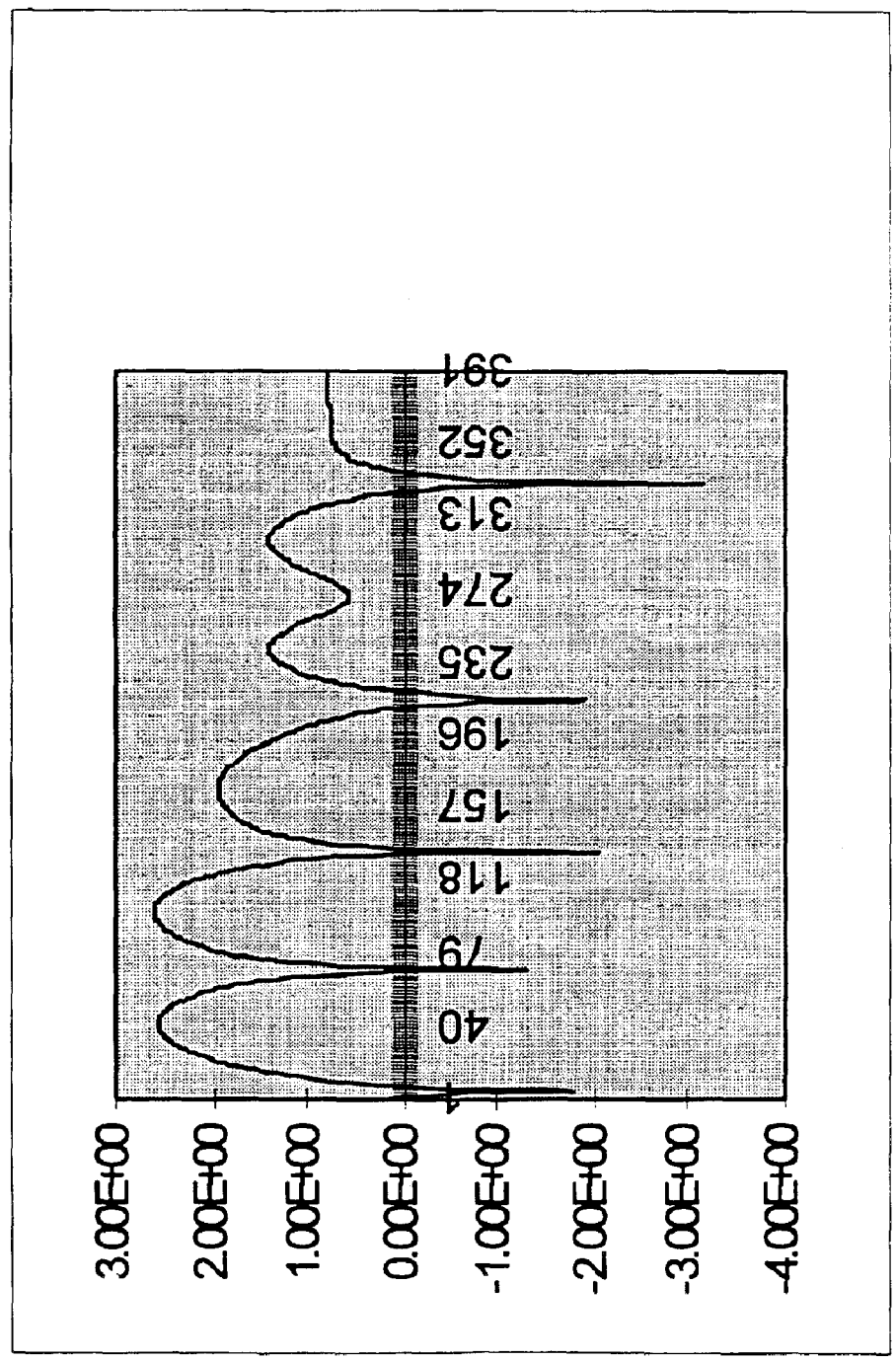
Figure 12:
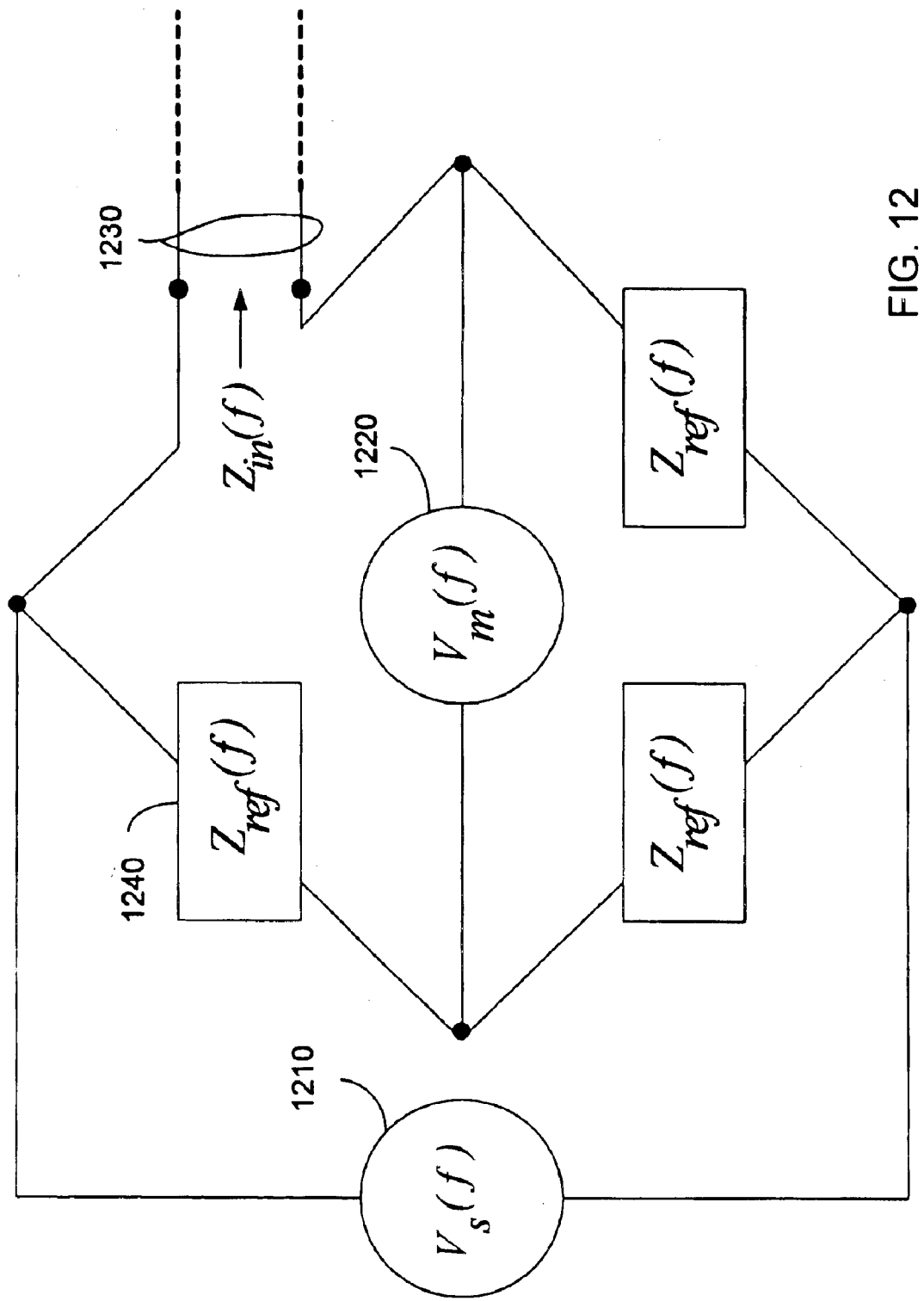
Figure 13:
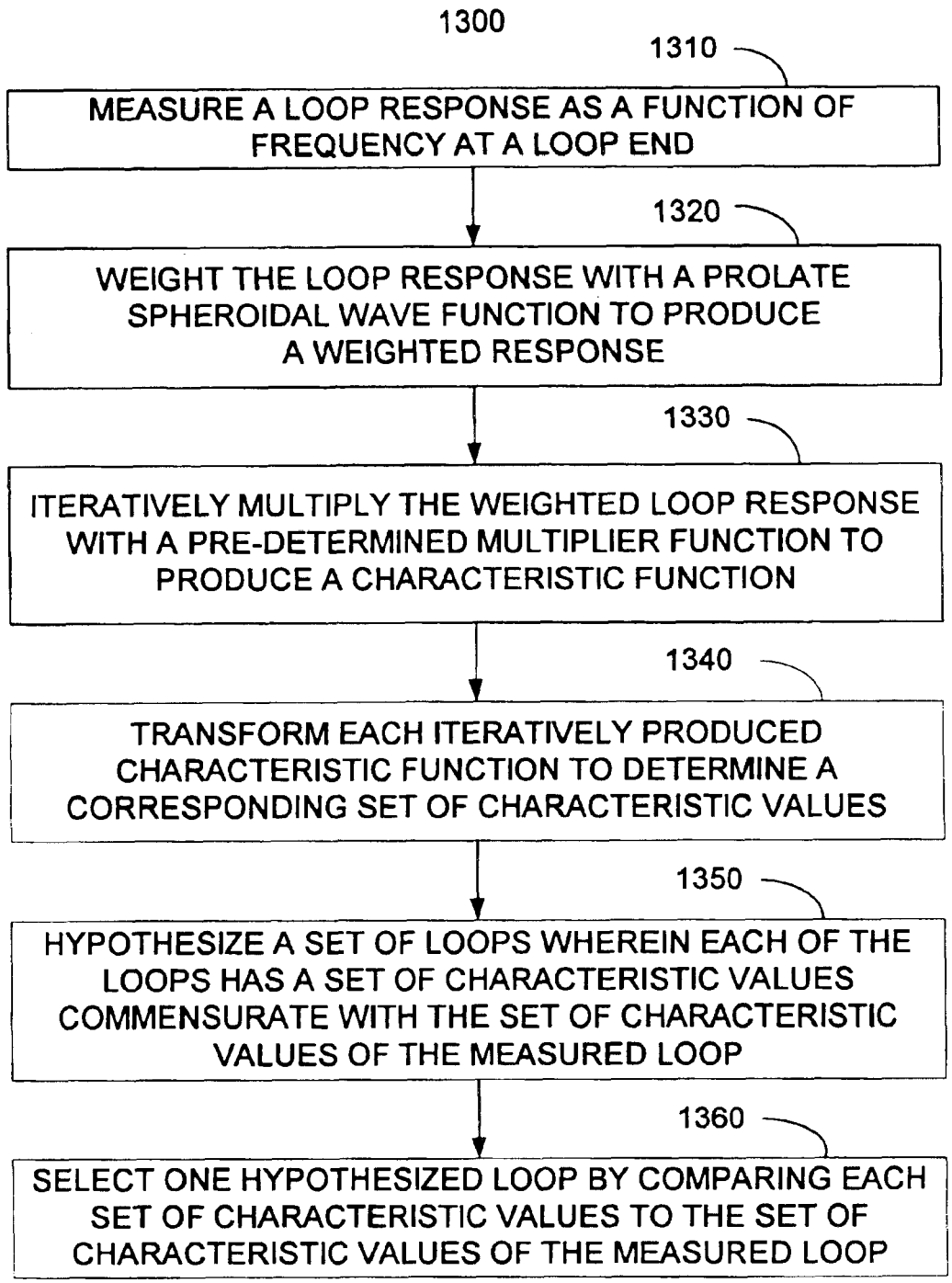

FIG. 8A repeats FIG. 4 for comparison to FIG. 8B which is a transform domain or spectral domain plot of the loop response of FIG. 3 weighted by the wave function of FIG. 5 to show that two peaks corresponding to the gauge change and the end of the loop are now readily identified;

FIG. 9 is a plot of the characteristic values for the weighted loop response described in FIG. 3 depicting the two spectral peaks corresponding to irregularities as a function of distance;

FIG. 10 is a transform or spectral domain plot of a loop response corresponding to the real part of return loss weighted by the wave function of FIG. 5 for a loop composed of: 10000 feet of 26-gauge cable, a bridged tap of 301 feet of 24 gauge cable, and 1000 feet of 26-gauge cable feet terminated in a conventional telephone set wherein the reference impedance equals to the characteristic impedance of 26-gauge cable and the frequency ranges from 100 kHz to 600 KHz;

FIG. 11A is a plot of the characteristic values for the weighted loop response described in FIG. 9 depicting numerous spectral peaks corresponding irregularities;

FIGS. 11B–11H are plots of the characteristic values of candidate loops for comparison to the characteristic values of FIG. 11A;

FIG. 11I is a plot of the characteristic values for the weighted loop response described in FIG. 9 wherein the measured loop response is corrupted by a noise of ±10% to show the robustness of the characteristic values to noise;

FIG. 12 is a high-level block diagram of circuitry for measuring the return loss as a function of frequency; and FIG. 13 is a flow diagram for the estimating distances to irregularities.

To facilitate understanding, identical reference numerals have been used, where possible, to designate identical elements that are common to the figures.

DETAILED DESCRIPTION

The disclosure of U.S. Pat. No. 3,904,839 is incorporated herein by reference; however, this detailed description will provide sufficient details to make this disclosure basically self-contained when pertinent to the claims.

Function Theoretical Basis

The return loss of a loop, $R(\omega)$, is defined by:

$$R = R(\omega) = \frac{Z_{in}(\omega) - Z_{ref}(\omega)}{Z_{in}(\omega) + Z_{ref}(\omega)}, \quad (1)$$

where $\omega$ is the radian frequency, $Z_{in}(\omega)$ is the input impedance of the subscriber loop as determined from the central office end of the loop, and $Z_{ref}(\omega)$ is a reference impedance.

There are two forms for equations (1): (i) a closed form for a simple loop configuration; and, (ii) a summation form for a complicated loop configuration. Each will be explained in order below.

Closed Form for a Simple Loop Configuration

In order to gain an insight of the principles in accordance with the present invention, it is enlightening to study a simple case of equation (1) which can be derived in closed form. Suppose that the subscriber loop under consideration is a single gauge cable of length L that is open-circuited at the far-end for the range of frequencies of interest (e.g., the customer's telephone instrument is on-hook), and $Z_{ref}(\omega)$ is chosen as equal to the characteristic impedance, designated $Z_0(\omega)$, of the given cable gauge. Since the loop is open-circuited at the far end, using well-known relations for electrical transmission lines, $Z_{in}(\omega)$ may be expressed as $$Z_{in}(\omega) = Z_0(\omega) \frac{ctnh(\gamma L)}{sinh(\gamma L)}, \text{ where } \gamma = \alpha + j\beta \text{ is the complex}$$

propagation of the cable gauge as a function of frequency. Then R in equation (1) can be reduced to $R=\exp(-2\gamma L)$. Taking the real part of R yields:

$Re(R)=\exp(-2\alpha L)\cos(2\beta L)$.

It is readily apparent that for this simple loop structure that the real part of the return loss is a co-sinusoidal waveform weighted by a decaying exponential. The cosine has a period determined by the cable length L. Accordingly, since the real part of return loss in the swept-frequency domain is a co-sinusoidal signal, it is possible, for example, to process Re(R) by a Fast Fourier Transform (FFT) to obtain the "spectral content" of Re(R) in a transformed domain. In this transformed domain, due to the co-sinusoidal nature of Re(R), the "spectral content" has one peak representative of the periodicity of the co-sinusoid. The period of the co-sinusoid is proportional to cable length L.

Figure 1:
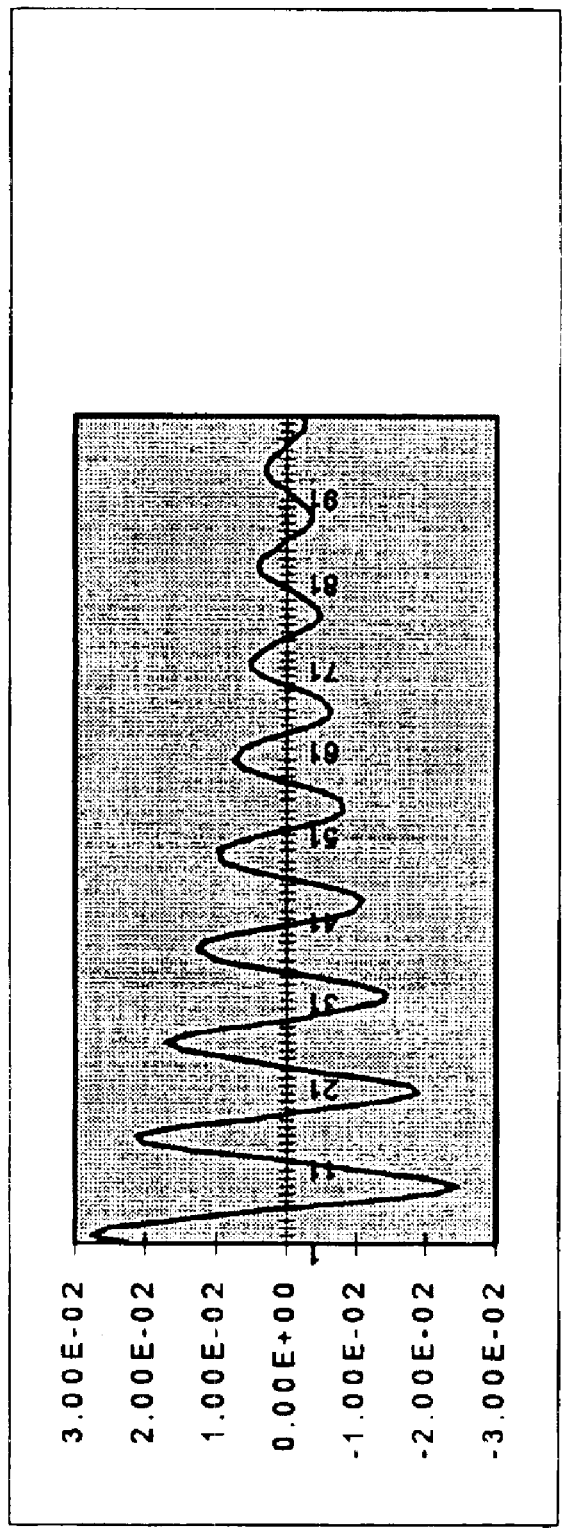
FIG. 1 is a frequency-domain plot of a loop response corresponding to the real part of return loss for a loop of 5000 feet of 26-gauge cable terminated in a conventional telephone set wherein the reference impedance equals to the characteristic impedance of 26-gauge cable and the frequency ranges from 100 kHz to 600 kHz.

To further demonstrate these principles graphically, reference is now made to FIG. 1 initially. FIG. 1 is a frequency-domain plot of a loop response corresponding to the real part of the return loss versus frequency for a loop of 5000 feet of 26-gauge cable terminated in a conventional telephone set wherein the reference impedance equals to the characteristic impedance of 26-gauge cable and the frequency ranges from 100 kHz to 600 kHz. The exponentially damped co-sinusoidal behavior is quite apparent.

Figure 2:
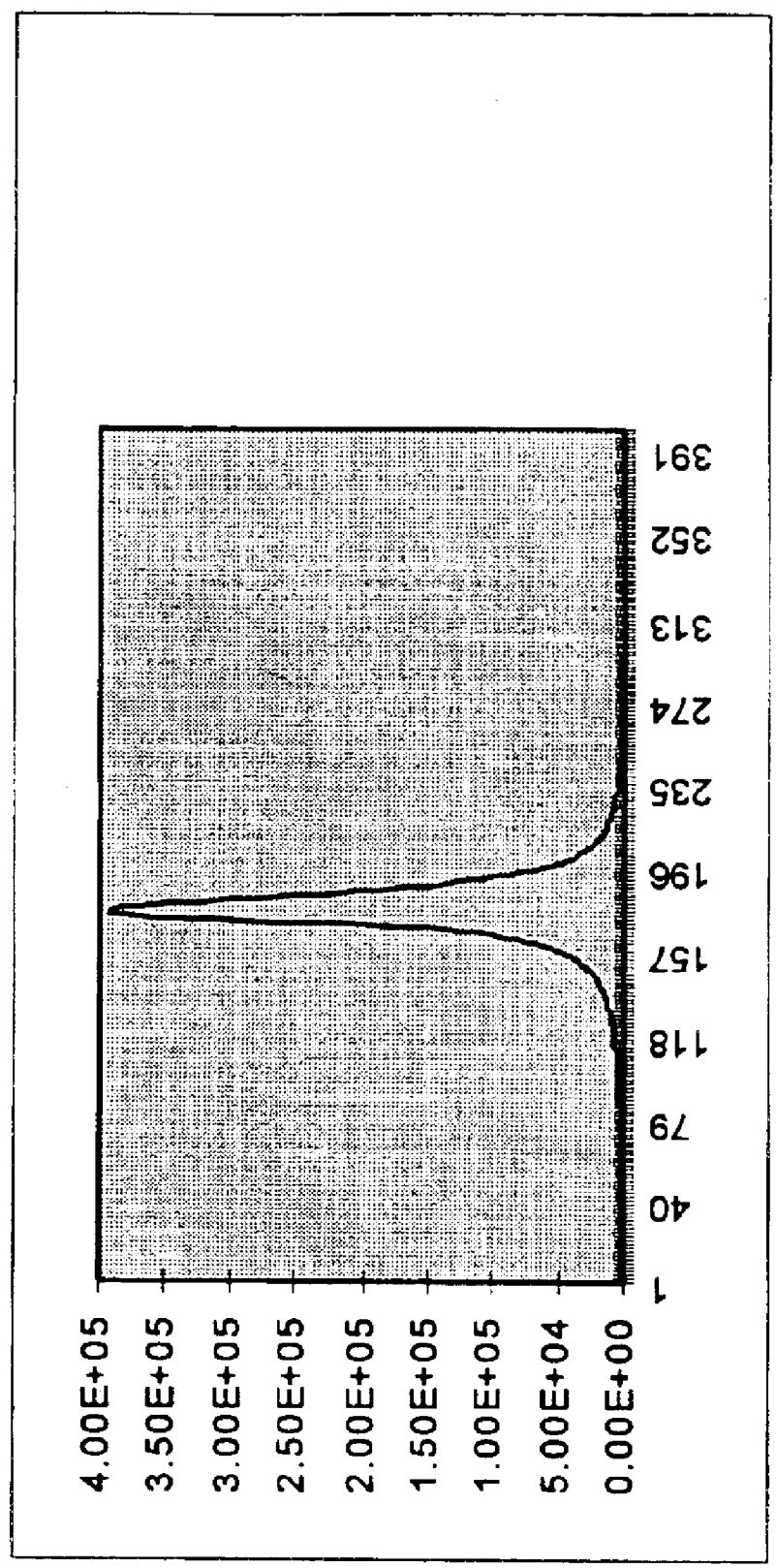
FIG. 2 is a transform domain or spectral domain plot of the loop response of FIG. 1 depicting the single peak corresponding to the end of the loop using a technique of the prior art.

FIG. 2 is a transform domain or spectral domain plot of the loop response of FIG. 1 depicting the single peak corresponding to the end of the loop using the default rectangular weight window of the prior art. The plot of FIG. 2 is obtained by applying a Fast Fourier Transform algorithm to the real part of the return loss. It is possible to estimate the distance to the irregularity (that is, the end of the loop since the cable abruptly ends in an open-circuit) using the relationships disclosed in U.S. Pat. No. 3,904,829, already alluded to in the Background Section, namely equations (4) and (8) in '829. However, as set forth below, a simpler and more accurate technique is elucidated. Thus, since the present interest is only in qualitative comparisons, the location of the peak at an abscissa value of approximately 170 is noted (the abscissa is a data-point normalized scale used for comparison to other plots discussed and shown below which are also normalized).

Summation Form for a Complicated Loop Configuration

For loops other than the simple configuration of a single length of cable, the loop response is very complex. Based on the simple case, the real part of the return loss is represented as a summation follows as:

$$R = R(\omega) = \sum_{i=1}^{N} \sum_{j=1}^{\infty} A_{ij}(\omega)\exp(-2j\alpha_i L_i)\cos(2j\beta_i L_i + \theta_i) \quad (2)$$

where $A_{ij}(\omega)$ is an amplitude function of $\omega$,

N is the number of irregularities, $L_i$ is the distance to the $i^{th}$ irregularity, and $\alpha_i$ and $\beta_i$ are the real and imaginary parts of the complex propagation constant associated with the $i^{th}$ irregularity.

Another way to write equation (2) is as follows:

$$R(\omega) = \sum_{i=1}^{N} A_i(\omega)\exp(-2\alpha_i L_i)\cos(2\beta_i L_i) + \text{multiple "reflection" terms.} \quad (3)$$

The manifestation of the multiple "reflection" terms will be apparent in the discussion that follows.

To demonstrate equations (2) or (3) graphically, reference is made to FIG. 3 which shows a frequency-domain plot of a loop response corresponding to the real part of return loss for a loop composed of 5000 feet of 26-gauge cable in cascade with 3000 feet of 24-gauge cable feet terminated in a conventional telephone set wherein the reference impedance equals to the characteristic impedance of 26-gauge cable and the frequency ranges from 100 kHz to 600 kHz. The loop response is characterized by a superposition of damped co-sinusoids wherein the amplitude as a function of frequency no longer has the simple decaying exponential form exhibited in FIG. 1, and the zero crossings are no longer uniform as the case in FIG. 1.

FIG. 4 is a transform domain or spectral domain plot of the loop response of FIG. 3, using rectangular weight window, that depicts a discernible peak corresponding to the end of the loop at 8000 feet and an essentially "masked peak" corresponding to the gauge change at 5000 feet. The interpretation of FIG. 4 is very difficult in the sense that if the loop configuration is not known beforehand, it is most likely one would be unsure if there is an irregularity in the abscissa range (157,235). Yet, given the postulated loop structure, one would also expect a peak at about 170 from the example covered by FIGS. 1 and 2. The masking of the peak corresponding to 5000 feet of 26-gauge cable is due to the fact that the irregularity at the gauge change is not as significant as the irregularity at the end of the loop. The irregularity at the gauge change is merely due to the change in cable gauge, that is, transitioning between gauges with cable constants that differ moderately, as compared to an abrupt open at the end of the loop, that is, transitioning from a gauge with a finite characteristic impedance to an open-circuit. The slow decay of the rectangular window in the transform domain centered on the distance representing the end of the line severely masks the peak due to the gauge transition.

To demonstrate how the results in the spectral domain can be improved significantly, a new window is introduced to reduce spectral interactions.

Prolate Spheroidal Wave Function (pswf) Window

A very useful window to improve the distance estimates in the spectral domain is the zero-order prolate spheroidal wave function (pswf) window. The pswf weighting basically eliminates slow decay of the weight function in the power spectral domain because the pswf has the unusual characteristic of being essentially limited in support or extent in both the frequency domain and in the transform domain. A algorithm for the pswf waveform useful for computer-based analysis is shown by the FORTRAN subroutine in the sole APPENDIX.

Figure 5A:
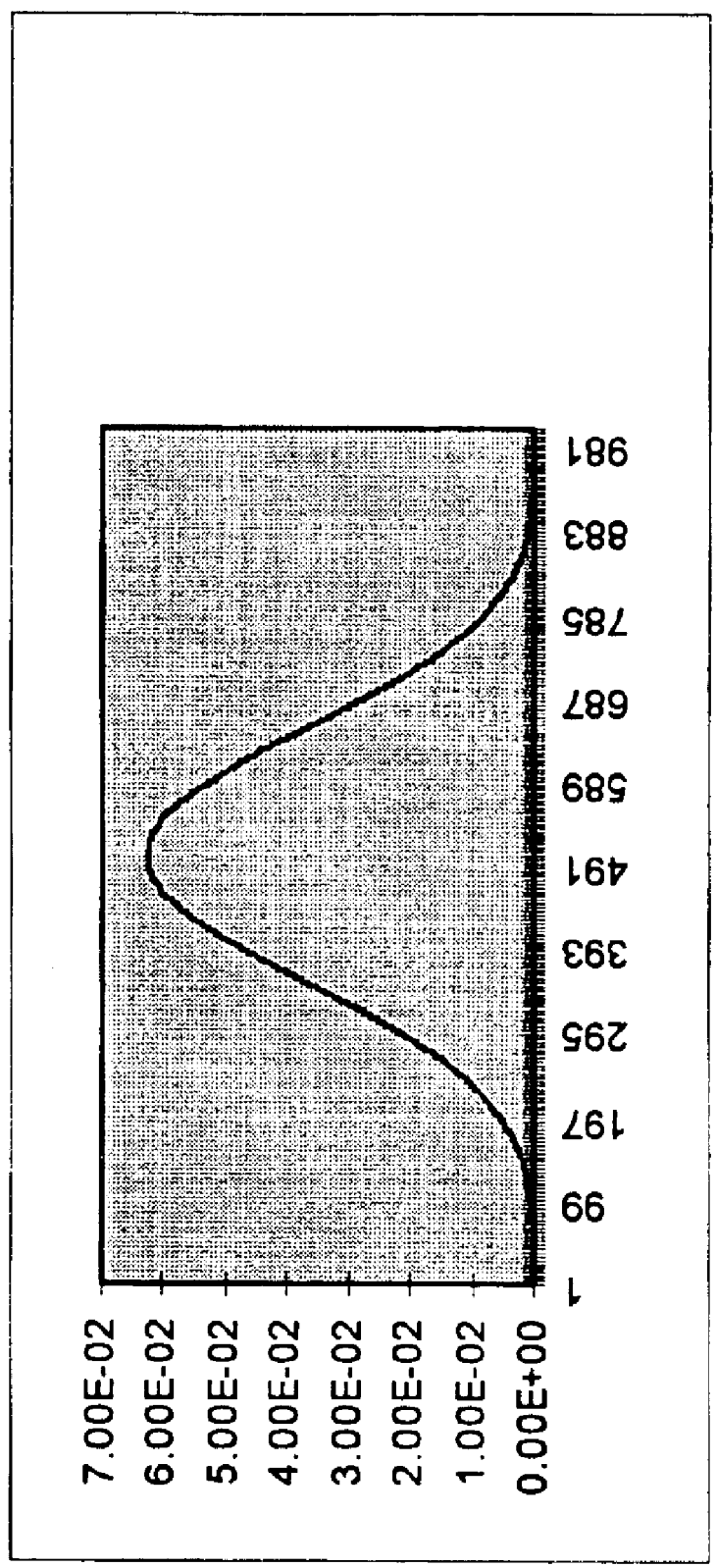
FIG. 5A is a plot of the zero-order prolate spheroidal wave function in the frequency domain over the frequency range 100 kHz to 600 kHz.

FIG. 5A is a plot of the zero-order prolate spheroidal wave function in the frequency domain over the frequency range 100 kHz to 600 kHz, which is compatible with the abscissa of the plots of FIGS. 1 and 3.

Figure 5B:
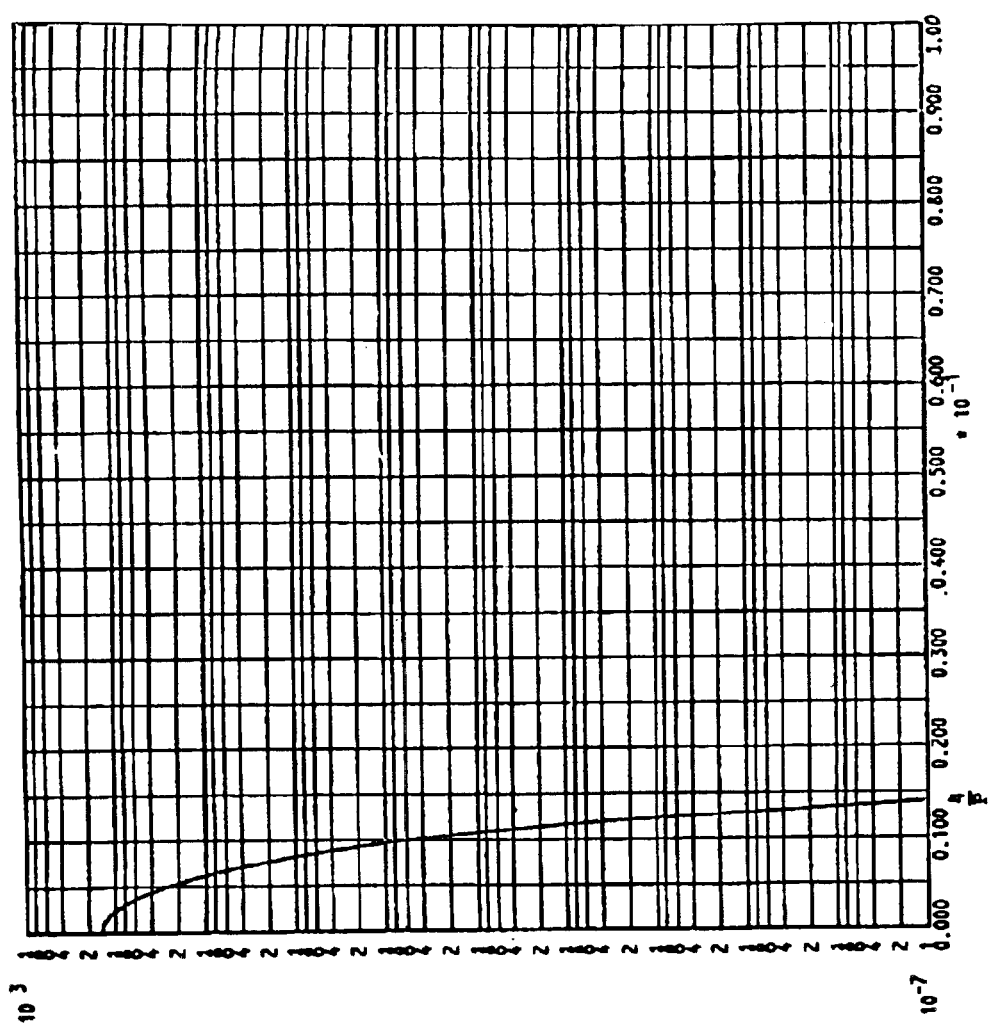
FIG. 5B is a plot of the pswf in the transform domain depicting its finite support.

FIG. 5B is a plot of the pswf waveform in the transform domain depicting its finite support.

Figure 5C:
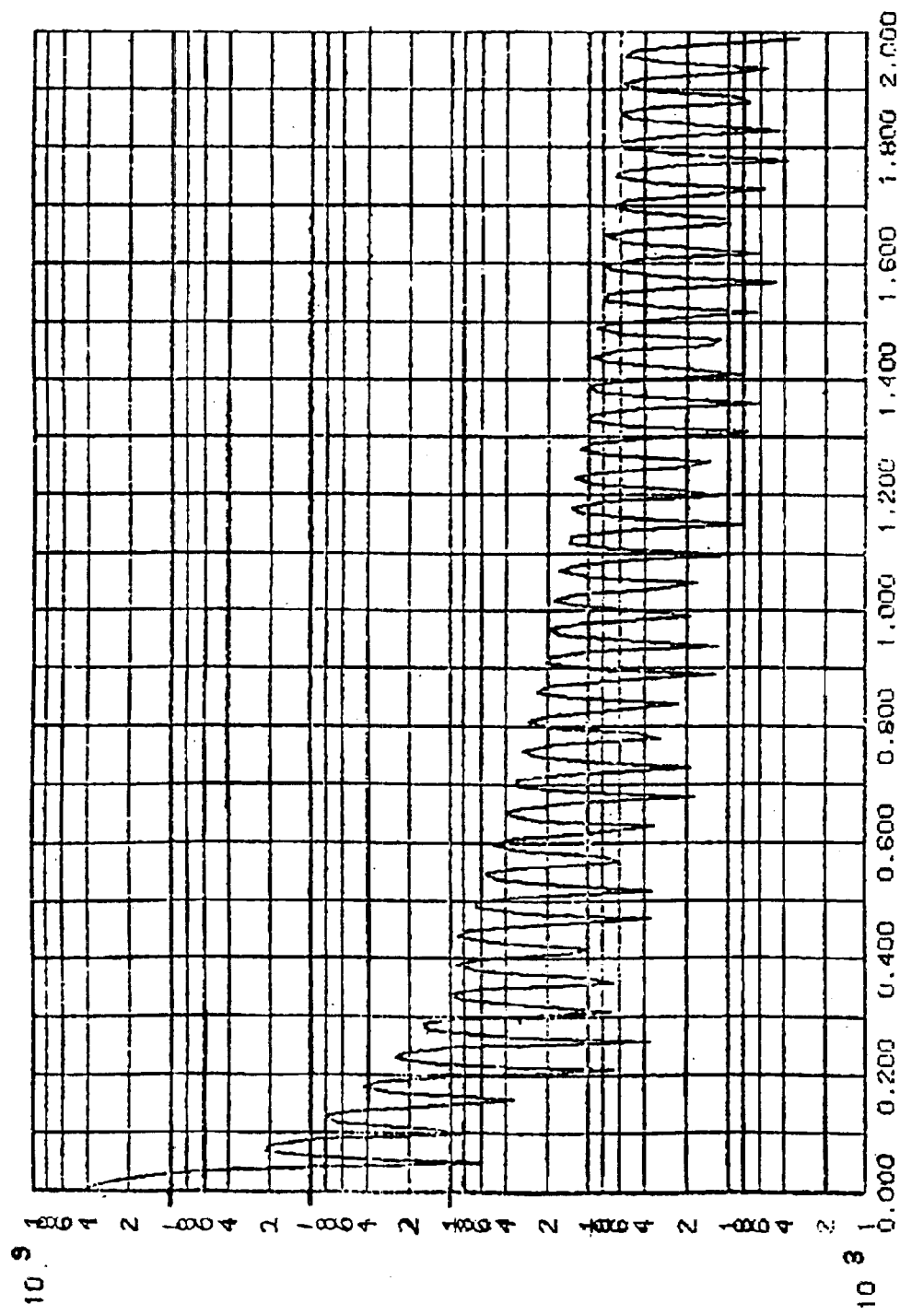
FIG. 5C is a plot of the rectangular window in the transform domain depicting its slow decay.

FIG. 5C is a plot of the rectangular window in the transform domain depicting its slow decay, which gives rise to aliasing, for comparison to FIG. 5B.

Figure 6:
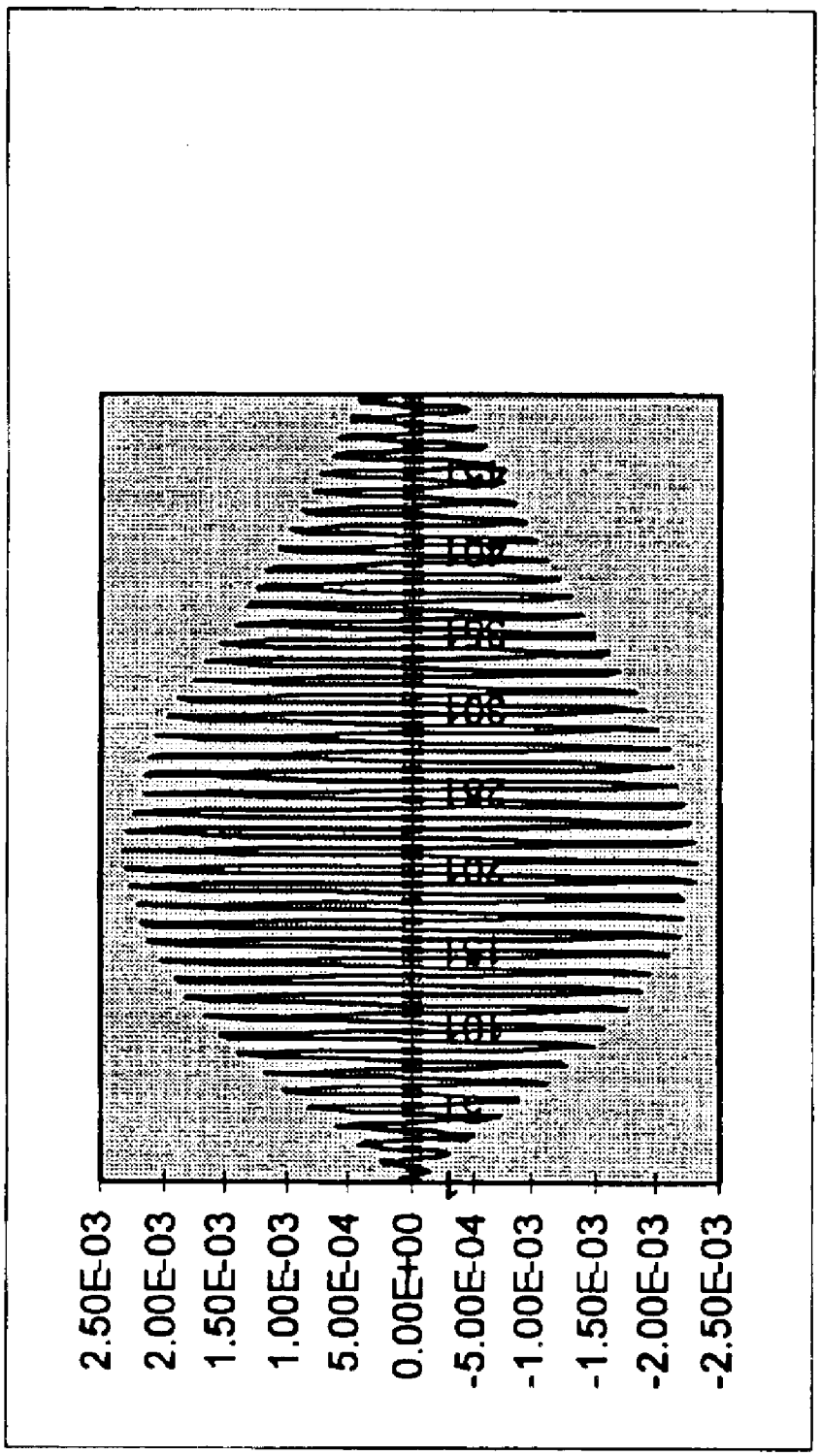
FIG. 6 is a plot of the weighted response of the loop of FIG. 1 obtained by multiplying the loop response of FIG. 3 by the wave function of FIG. 5.

FIG. 6 is a plot of the weighted response of the loop of FIG. 1 obtained by multiplying the loop response of FIG. 3 by the pswf waveform of FIG. 5.

Figure 7:
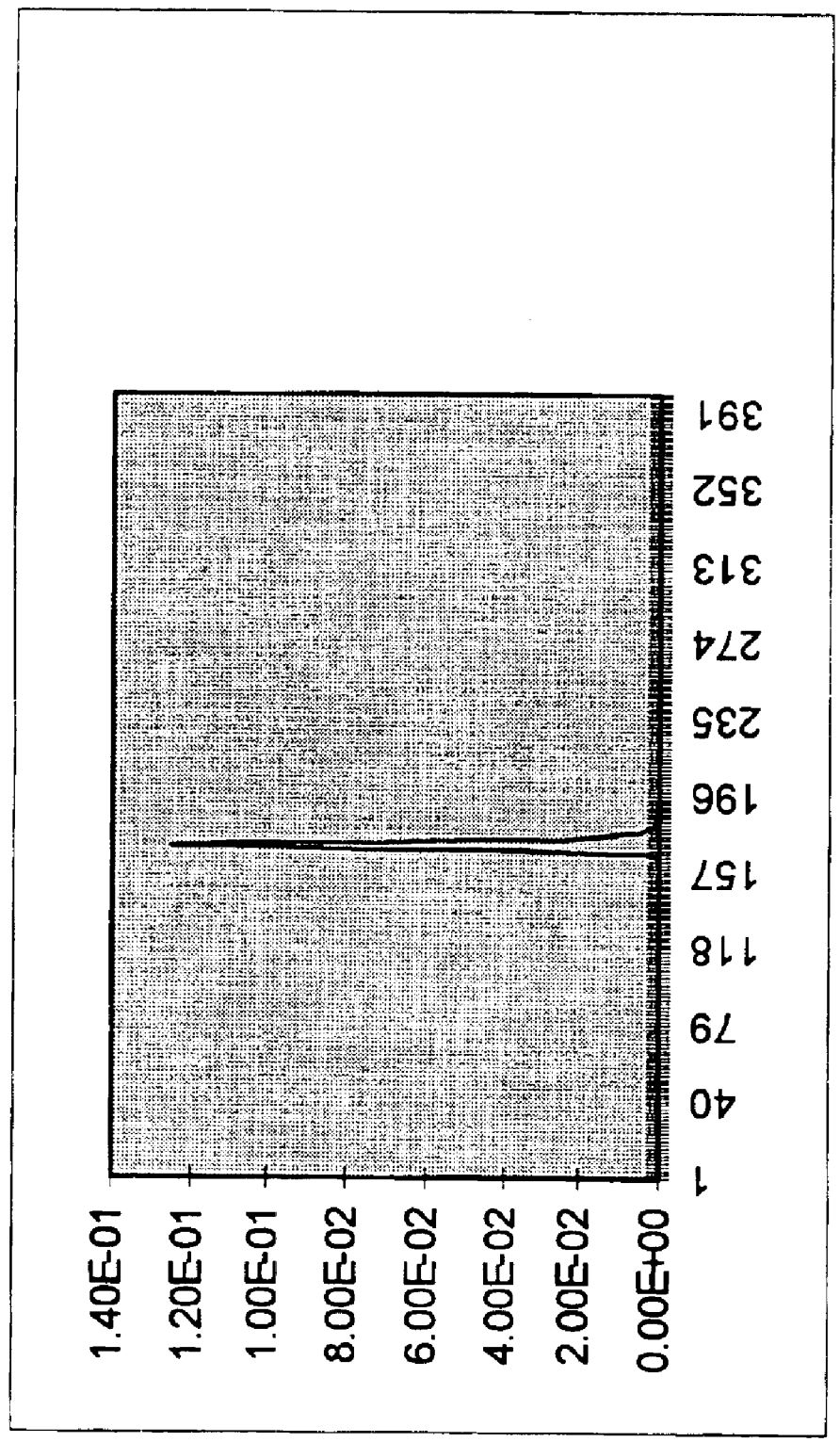
FIG. 7 is a transform domain or spectral domain plot of the loop response of FIG. 6 for comparison to FIG. 2 wherein the single peak corresponds to the end of the loop.

FIG. 7 is a transform domain or spectral domain plot of the weighted loop response of FIG. 6 for comparison to FIG. 2 wherein the single peak corresponds to the end of the loop. No real new information is obtained for the simple case since aliasing is not an issue for a single peak using a rectangular window.

However, the improvement fostered by the pswf waveform is readily apparent in FIG. 8-8A repeats FIG. 4 for comparison to FIG. 8B which is a transform domain or spectral domain plot of the loop response of FIG. 3 weighted by the pswf waveform. Clearly, the two peaks corresponding to the gauge change and the end of the loop are now easily identified.

Length Estimates Using the Characteristic Function and Characteristic Values

To both determine estimates of distances to irregularities and further improve the resolution in the spectral domain, additional signal processing on the pswf-weighted loop response is now introduced.

First, a so-called characteristic function for a loop response is determined based upon the following well-known relation:

$$\cos(A)\cos(B)=[\cos(A-B)+\cos(A+B)]/2 \quad (4)$$

where A and B are arbitrary. Whenever A=B, then equation (4) becomes $$\cos(A)\cos(A)=[1+\cos(2A)]/2. \quad (5)$$

In the spectral domain, that is, if equation (5) is transformed, there is a peak at the 0 abscissa value from the (½) term, and another peak at the abscissa corresponding to the term $[\cos(2A)]/2$.

Now consider applying this principle to the loop response by multiplying equation (4) by $\cos(2\beta_c L_c)$ where $\beta_c$ is presumed known (e.g., β for 26-gauge cable, or 24-gauge cable, or an average over the known cable gauges) and $L_c$ is a selected length. This leads to, ignoring the multiple reflection terms for the moment:

$$\left[\sum_{i=1}^{N} A_i(\omega)\exp(-2\alpha_i L_i)\cos(2\beta_i L_i)\right]\cos(2\beta_c L_c). \quad (6)$$

If $\beta c=\beta i$, and focusing on the cosine terms only of equation (6) as follows:

$$\cos(2\beta_i L_i)\cos(2\beta_c L_c)=[\cos(2\beta_c(L_i-L_c))+\cos(2\beta_c(L_i+L_c))]/2. \quad (7)$$

If $L_c$ is iteratively varied over a range (say over the length of the loop or even over an intermediate length encompassing the irregularities), then at values of $L_c$ equal to the $L_i$'s, the right-hand side of equation (7) becomes $$[1+\cos(4\beta_c L_c)]/2. \quad (8)$$

Thus, peaks in the spectral domain at each $L_i$ can be shifted to the 0-abscissa value by the proper choice of $L_c$. The term at the 0-abscissa is called the characteristic value. If each characteristic value is determined for each of the iteratively selected values of $L_c$, and all the characteristic values form a set, then the peaks in the set estimate the $L_i$'s.

FIG. 9 is a plot of the characteristic values for the weighted loop response described in FIG. 3 depicting two spectral peaks corresponding irregularities as a function of distance. The range for $L_c$ in feet is (4500, 8500), which covers the two spectral peaks at 5000 and 8000 feet; the abscissa values of 50 and 350 give a direct reading of the distances to the peaks.

Characteristic Value and PSWF Applied to a Complex Loop

As can be anticipated from the expressions of equations (2) or (3), certain loop structures can be problematic. For instance, because the loss of 26-gauge cable is greater than the other standard gauges (19, 22, 24) manifested by the real part of the complex propagation constant (namely, α), and 26-gauge cable is nearest to the central office or measurement end, irregularities beyond long lengths of 26-gauge cable can be masked. To demonstrate this effect, consider the plot of FIG. 10 which is a transform or spectral domain plot of a loop response corresponding to the real part of return loss weighted by pswf waveform for a loop composed of: 10000 feet of 26-gauge cable, a bridged tap of 301 feet of 24 gauge cable, and 1000 feet of 26-gauge cable feet terminated in a conventional telephone set wherein the reference impedance equals to the characteristic impedance of 26-gauge cable and the frequency ranges from 100 kHz to 600 KHz. The large peak at an abscissa of approximately 355 corresponds to the 10000-foot length of 26 gauge cable. There is a small peak at about an abscissa 400 which is barely discernible. Given the loop structure, there are at least three peaks that should be discernable, namely, at 10000 feet (the "main" section), 10301 feet (the "main" section plus the bridged tap length of 301 feet), and 11000 feet (the "main" section plus the "end" section of 1000 feet).

FIG. 11A is a plot of the set of characteristic values for the pswf-weighted loop response described in FIG. 9 depicting numerous spectral peaks corresponding to irregularities and/or their multiple reflections. The initial value of $L_c$ is 9800 feet and it is incremented by 5 feet up to a value of 11800 feet. $\beta_c$ is the value exhibited by 26-gauge cable. It is readily apparent that there is a characteristic value at 10000 feet. Moreover, there is another characteristic value at 10295, which is the length of the "main" section plus the bridge tap. Also, there is a peak at 10625 which corresponds to a multiple reflection term for the bridged tap. Also, there is a peak at 11000 feet which corresponds to the "main" section plus the "end" section. Finally, there is a peak at 11295 feet which corresponds to a multiple reflection term for the sum of the main, bridged tap, and end sections.

The plot of FIG. 11A illustrates a technique with significant ramifications that requires reiteration. It is possible using the characteristic function/characteristic value approach to move the vantage point along a loop to focus only on a range of distances of interest (e.g., 9800 to 11800 feet in the example of FIG. 11A), while ignoring the configuration of the loop at other distances not of immediate interest. This technique results in applying a so-called "distance filter" to the loop, which may be analogized to a bandpass-filter in the frequency domain.

The ultimate utility for the set of characteristic values is one of determining loop structure. Recall that the transform domain response of FIG. 10 exhibited basically two discernible peaks. From the set of characteristic values of FIG. 11A, it is clear that there at least three other discernible peaks. The technique to estimate the loop structure is as follows. A set of candidate loops which is expected to have sets of characteristic values exhibited by the measured loop is postulated. This set of candidate loops is constructed based upon the information contained in the set of characteristic values for the measured loop. For example, in FIG. 11A, it is possible to deduce from the set of characteristic values that there is: (a) an irregularity at 10000 feet, (b) an irregularity at 10295 feet, (c) an irregularity or a reflection showing up as a peak at 10625 feet, (d) another irregularity or reflection peak at 11000 feet, and (e) a final irregularity or reflection at 11295 feet.

A subset of the set of candidate loops may then be constructed (the subset is meant to be exemplary of the technique to construct the set of candidate loops; the actual set of candidate loops is much larger in practice). The candidate loops exhibit response characteristics that should closely resemble the loop response. The loops are composed of:

(1) in cascade, 10000 feet of 26 gauge, 300 feet of 24 gauge, and 300 feet of 26 gauge; the set of characteristic values is shown in FIG. 11B;

(2) 10000 feet of 26 gauge, 300 feet of 24 gauge, a 26 gauge bridged tap of length 300 feet, and an end-section of 700 feet of 26 gauge; the set of characteristic values is shown in FIG. 11C;

(3) 10000 feet of 26 gauge, a 26 gauge bridged tap of length 300 feet, and an end-section of 700 feet of 26 gauge; the set of characteristic values is shown in FIG. 11D;

(4) 10000 feet of 26 gauge, a 26 gauge bridged tap of length 300 feet, and an end-section of 850 feet of 26 gauge; the set of characteristic values is shown in FIG. 11E;

(5) 10000 feet of 26 gauge, a 26 gauge bridged tap of length 300 feet, and an end-section of 850 feet of 24 gauge; the set of characteristic values is shown in FIG. 11F;

(6) 10000 feet of 26 gauge, a 26 gauge bridged tap of length 300 feet, a 300 foot section of 26 gauge, a 26 gauge bridged tap of 100 feet, and an end-section of 300 feet of 24 gauge; the set of characteristic values is shown in FIG. 11G;

(7) 10000 feet of 26 gauge, a 26 gauge bridged tap of 300 feet, and an end section of 1000 feet of 26 gauge; the set of characteristic values is shown in FIG. 11H.

From the responses of FIG. 11A-11G it is possible to deduce: (i) the loop of FIG. 11B has only 3 peaks in the range between the data point range (1,340), so it is eliminated from consideration; and (ii) the loop of FIG. 11D has 6 peaks, so it too is eliminated. Consider the following table of peaks in the set of characteristic values in Table 1:

TABLE 1

| Peak | FIG. 11A | FIG. 11C | FIG. 11E | FIG. 11F | FIG. 11G | FIG. 11H |
|---|---|---|---|---|---|---|
| first | 41 | 10 | 41 | 41 | 41 | 41 |
| second | 100 | 100 | 100 | 100 | 106 | 100 |
| third | 165 | 150 | 162 | 160 | 148 | 167 |
| fourth | 241 | 210 | 214 | 212 | 226 | 241 |
| fifth | 300 | 298 | 271 | 267 | 289 | 300 |

A "similarity measure" between the measured loop and the candidate loops is defined to evaluate the degree of similarity between the measured loop and the candidate loops. For example, one similarity measure is based upon the least-squares measure (other measures can readily be defined, such as minimum distance, and so forth) as follows:

$$\text{Similarity Measure} = \min\left\{\sum_{i=1}^{peaks} (p_{mi} - p_i)^2\right\}, \quad (9)$$

where $p_{mi}$ and $p_i$ are the peaks in the measured loop and any of the candidate loops, respectively.

This similarity measure applied to the data of Table 1 yields the loop of FIG. 11H as the loop configuration closest to the measured loop. In fact, the loop of FIG. 11H has the same electrical distances, but the gauge of the bridged tap differs from the gauge of the measured loop. This is to be expected since it is extremely difficult to differentiate gauge changes at the end of a long section emanating from the central office up to the point of the bridged tap. On the other hand, the loop configuration has been correctly identified. Note the "closeness" of loop configuration in terms of electrical length of the loops of FIGS. 11E and 11F (end section of 850 feet rather than 1000 feet). Yet the similarity measure correctly selected the loop with essentially the same electrical lengths. It must be emphasized that the loops under consideration have a combined length of over 11000 feet, so distances of the order of 100–300 feet are only 1%–3% of the total loop length. In other words, the technique of using the characteristic function to obtain characteristic values and, in turn, using the characteristic values to compute a similarity measure is a very sensitive technique. Moreover, and this is a critical point for other known procedures, the technique of the present invention does not require the subtraction of two large numbers (such as the input impedance or return loss, or even a time domain reflected signal) to arrive at a small number; such procedures introduced significant error which is basically uncontrollable.

In line with this discussion, the technique of the present invention is robust in the presence of noise. Other known procedures, especially those relying upon the subtraction of two large numbers, have extreme accuracy problems in the presence of noise. To demonstrate the robustness of the characteristic function approach, the plot of the characteristic values in FIG. 11I is for the same loop used to generate FIG. 11A, that is, the plot of FIG. 11I shows the characteristic values for the weighted loop response described in FIG. 9 wherein the measured loop response is corrupted by a noise of ±10%. There is no discernible difference between the set of characteristic values with and without noise.

Measuring Return Loss

High-level circuit diagram 1200 of FIG. 12 illustrates a bridge arrangement for measuring the return loss. $V_s(f)$ (1210) is the measurement source, which may be a swept frequency source or a periodically swept frequency source to expedite frequency domain measurements. The reference impedance is shown as $Z_{ref}(\omega)$ (1240). The input to the loop (1230) provides $Z_{in}(\omega)$. $V_m(f)$ (1220) is measured across the bridge legs. The real part of the return loss is the in-phase component of $V_m(f)/V_s(f)$.

Flow Diagram

Flow diagram 1300 of FIG. 13 depicts the series of operational steps to carry out one broad aspect of the present invention. As shown by processing block 1310, a measurement of a loop response is effected as a function of frequency from a loop end. Then, as per processing block 1320, the loop response is weighted with the pswf waveform to produce a weighted response. Next, as per processing block 1330, the step of iteratively multiplying the weighted loop response with a pre-determined multiplier function to produce a characteristic function is effected. As then shown by processing block 1340, the step of transforming each iteratively produced characteristic function to determine a set of corresponding characteristic values is carried out. Next, as per processing block 1350, the step of hypothesizing a set of loops wherein each of the loops in the set has a set of characteristic values commensurate with the set of characteristic values of the measured loop is executed. Finally, as per processing block 1360, the step of selecting one of the loops from the set of loops based upon a comparison of each set of characteristic values of each of the loops to the set of characteristic values of the measured loop completes the process.

Although various embodiments which incorporate the teachings of the present invention have been shown and described in detail herein, those skilled in the art can readily devise many other varied embodiments that still incorporate these teachings.

APPENDIX

```
      subroutine pswfdw(x,ndata,ntrf,dps)
      dimension x(ndata)
      double precision dnd,dz,zbase,dn,cum,pr,q,crct,h,a(30)
c
c     x data array or scratch storage
c
c     ndata no. data points
c
c     ntrf iabs(ntrf) = no. of transformation points
c
c     ntrf.lt.0 - returns data window in x
c
c     ntrf.gt.0 - returns x * data window
c
c     dps data point spacing
c
c     spheroidal expansion coefficients n=0,a=.5,c=4*pi,1-x**2
c     20 expansion coefficients sufficient for single precision
      data ntrm,h       /20,5.08125548147497d-01/
        data a(1),a(2),a(3),a(4),a(5),a(6),a(7),a(8),a(9),a(10),
     1  a(11),a(12),a(13),a(14),a(15),a(16),a(17),a(18),a(19),
     2  a(20),a(21),a(22),a(23),a(24),a(25),a(26),a(27),a(28),
     3  a(29),a(30)/
     1  4.2904633140034d-05, 1.5672417352380d-03,
     2  1.4476509897632d-02, 5.9923940532892d-02,
     3  1.4041394473085d-01, 2.1163435697968d-01,
     4  2.2242525852102d-01, 1.7233583271499d-01,
     5  1.0252816895203d-01, 4.8315671140720d-02,
     6  1.8482388295519d-02, 5.8542015072142d-03,
     7  1.5607376779150d-03, 3.5507361197109d-04,
     8  6.9746276641509d-05, 1.1948784162527d-05,
     9  1.8011359410323d-06, 2.4073904863499d-07,
     9  2.8727486379692d-08, 3.0793023552299d-09,
     1  2.9812025862125d-10, 2.6197747176990d-11,
     2  2.0990311910903d-12, 1.5396841106693d-13,
     3  1.0378004856905d-14, 6.4468886153746d-16,
     4  3.6732920587994d-17, 1.6453834571404d-18,
     5 -2.1474104369670d-19,-2.9032658209519d-19/
      nti=iabs(ntrf)
      ndi=min0(nti,ndata)
      dnd=ndi
      dz=2./dnd
      zbase=-(1.d+00+dz/2.)
      nh=(ndi+1)/2
      ndp=ndi+1
      crct=dsqrt(2.*dps/(h*dnd))
      assign 80 to ng1
      if(ntrf.lt.0) assign 90 to ng1
      do 100 n=1,nh
      dn=n
      z=zbase+dz*dn
      q=1.-z**2
      cum=a(1)
      pr=1.d+00
      j=1
50    j=j+1
      pr=pr*q
      cum=cum+a(j)*pr
      if((pr.gt.1.e-09).and.(j.lt.ntrm)) go to 50
      cum=cum*crct
      n1=ndp-n
      go to ng1,(80,90)
80    x(n)=x(n)*cum
      if(n.eq.n1) go to 100
      x(n1)=x(n1)*cum
      go to 100
90    x(n)=cum
      x(n1)=cum
100   continue
      return
      end
```

What is claimed is:

1. A method for estimating distances to irregularities on a subscriber loop comprising the steps of measuring a loop response as a function of frequency at a loop end, weighting the loop response with a pre-selected prolate spheroidal wave function to produce a weighted response, and generating a spectral analysis of the weighted response wherein the estimated distances to the irregularities correspond to peaks in the spectral analysis.

2. The method as recited in claim 1 wherein the step of generating the spectral analysis of the weighted function includes the steps of transforming the weighted function via a Fourier Transform to produce a transformed function, and identifying the peaks in the transformed function to obtain the estimated distances.

3. The method as recited in claim 1 wherein the step of generating the spectral analysis of the weighted function includes the steps of transforming the weighted function via a Fast Fourier Transform to produce a transformed function, and identifying the peaks in the transformed function to obtain the estimated distances.

4. The method as recited in claim 1 wherein the loop response is the real part of the return loss of the loop with respect to a reference impedance and the step of measuring includes the step of measuring a swept-frequency signal proportional to the real part of the return loss.

5. The method as recited in claim 1 wherein the loop response is composed of exponentially decaying co-sinusoids and the step of measuring includes the step of measuring a swept-frequency signal proportional to the loop response.

6. A method for estimating distances to irregularities on a subscriber loop comprising the steps of
   measuring the real part of the return loss of the loop using a pre-selected reference impedance over a band of frequencies to generate a loop response,
   weighting the loop response with a pre-selected prolate spheroidal wave function to generate a weighted loop response,
   iteratively multiplying the weighted loop response with a pre-determined multiplier function to produce a characteristic function,
   transforming each iteratively produced characteristic function to determine a set of corresponding characteristic values, and
   selecting local maxima from the set of characteristic values as estimates to the distances to the irregularities.

7. The method as recited in claim 6 wherein the step of transforming includes the step of Fourier Transforming the weighted loop response.

8. The method as recited in claim 6 wherein the step of transforming includes the step of Fast Fourier Transforming the weighted loop response.

9. The method as recited in claim 6 wherein the multiplier function is a co-sinusoidal function and the step of iteratively multiplying includes the step of incrementally selecting a new period for the co-sinusoidal function with reference to the length of the loop.

10. The method as recited in claim 6 wherein the multiplier function is a co-sinusoidal function and the step of iteratively multiplying includes the step of incrementally selecting a new period for the co-sinusoidal function with reference to intermediate distances along the loop.

11. The method as recited in claim 6 further including the steps, after the step of selecting, of
   hypothesizing a set of loops having irregularities commensurate with the estimated distances to the irregularities, and
   selecting one of the loops from the set by comparing the measured loop response to a corresponding loop response from the selected one of the sloop.

12. A method for determining a configuration for a subscriber loop comprising the steps of
   measuring a loop response as a function of frequency at a loop end,
   weighting the loop response with a weight function to produce a weighted response,
   generating a spectral analysis of the weighted response wherein the estimated distances to the irregularities correspond to peaks in the spectral analysis,
   hypothesizing a set of loops having irregularities commensurate with the estimated distances to the irregularities, and
   selecting one of the loops from the set by comparing the measured loop response to a corresponding loop response from the selected one of the loops.

13. The method as recited in claim 12 wherein the step of weighting includes the step of weighting the loop response with a prolate spheroidal wave function waveform.

14. A method for determining the configuration of a subscriber loop comprising the steps of
   measuring the real part of the return loss of the loop using a pre-selected reference impedance over a band of frequencies to generate a loop response,
   weighting the loop response with a spectral window to generate a weighted loop response,
iteratively multiplying the weighted loop response with a pre-determined multiplier function to produce a characteristic function,
   transforming each iteratively produced characteristic function to determine a set of corresponding characteristic values,
   hypothesizing a set of loops wherein each of the loops in the set has a set of characteristic values commensurate with the set of characteristic values of the measured loop, and
   selecting one of the loops from the set of loops based upon a comparison of each set of characteristic values of each of the loops to the set of characteristic values of the measured loop.

15. The method as recited in claim 14 wherein the step of weighting includes the step of multiplying the loop response by a pre-selected prolate spheroidal wave function to produce the weighted response.

16. The method as recited in claim 14 wherein the step of transforming includes the step of Fourier Transforming the weighted loop response.

17. The method as recited in claim 14 wherein the step of transforming includes the step of Fast Fourier Transforming the weighted loop response.

18. The method as recited in claim 14 wherein the multiplier function is a co-sinusoidal function and the step of iteratively multiplying includes the step of incrementally selecting a new period for the co-sinusoidal function with reference to the length of the loop.

19. The method as recited in claim 14 wherein the multiplier function is a co-sinusoidal function and the step of iteratively multiplying includes the step of incrementally selecting a new period for the co-sinusoidal function with reference to intermediate distances along the loop.

* * * * *

UNITED STATES PATENT AND TRADEMARK OFFICE
CERTIFICATE OF CORRECTION

PATENT NO. : 6,914,963 B2 Page 1 of 1
DATED : July 5, 2005
INVENTOR(S) : John T. Peoples It is certified that error appears in the above-identified patent and that said Letters Patent is hereby corrected as shown below:

Column 13,
Line 41, delete "sloop" and insert -- loops --.

Signed and Sealed this

Thirtieth Day of August, 2005

JON W. DUDAS
*Director of the United States Patent and Trademark Office*